(12) United States Patent
Shindo et al.

(10) Patent No.: US 6,492,037 B2
(45) Date of Patent: *Dec. 10, 2002

(54) JOINED STRUCTURE OF DISSIMILAR METALLIC MATERIALS

(75) Inventors: Takahiko Shindo, Yokohama (JP); Yoshiyasu Itoh, Yokohama (JP); Katsumi Suzuki, Yokohama (JP)

(73) Assignee: Kabushiki Kaisha Toshiba, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/193,845

(22) Filed: Nov. 18, 1998

(65) Prior Publication Data

US 2002/0061417 A1 May 23, 2002

(30) Foreign Application Priority Data

| Jul. 11, 1997 | (JP) | 9-305634 |
| Nov. 19, 1997 | (JP) | 9-318006 |
| Nov. 19, 1997 | (JP) | 9-318018 |
| Dec. 12, 1997 | (JP) | 9-342554 |
| Apr. 21, 1998 | (JP) | 10-110847 |

(51) Int. Cl.⁷ .................. B32B 15/20; B32B 15/01; H01H 1/12

(52) U.S. Cl. ............ 428/615; 428/650; 428/651; 428/652; 428/653; 428/660; 428/661; 428/663; 428/664; 428/665; 324/424; 200/238; 200/275

(58) Field of Search .................. 428/615, 650, 428/651, 652, 653, 660, 661, 663, 664, 665; 324/424; 361/115, 673; 200/238, 275

(56) References Cited

U.S. PATENT DOCUMENTS

| 3,630,694 A | * | 12/1971 | Enright et al. ............. 29/196.2 |
| 3,798,010 A | * | 3/1974 | Sharp et al. ............... 29/196.2 |
| 3,949,466 A | | 4/1976 | O'Brien et al. |
| 4,098,449 A | | 7/1978 | Noesen |
| 4,228,944 A | * | 10/1980 | Inamura et al. ............. 228/198 |
| 4,331,280 A | * | 5/1982 | Terabayashi et al. ....... 228/112 |
| 4,756,465 A | | 7/1988 | Pranch et al. |
| 5,248,077 A | * | 9/1993 | Rhoades et al. ......... 228/112.1 |
| 5,366,344 A | | 11/1994 | Gillbanks |
| 5,723,839 A | * | 3/1998 | Kozawa et al. ............... 218/43 |
| 5,967,402 A | * | 10/1999 | Kuwabara ................... 228/194 |

FOREIGN PATENT DOCUMENTS

| EP | 887143 | | 12/1998 | |
| JP | 1-282166 | | 11/1989 | |
| JP | 4143085 | * | 5/1992 | ............. 228/262.5 |
| JP | 4270078 | * | 9/1992 | ............. 228/262.5 |
| JP | 6-47570 | | 2/1994 | |
| JP | 1079208 | * | 3/1998 | |

* cited by examiner

*Primary Examiner*—Deborah Jones
*Assistant Examiner*—Jennifer McNeil
(74) *Attorney, Agent, or Firm*—Foley & Lardner

(57) ABSTRACT

A friction welded joint structure includes friction welded dissimilar first and second metallic materials. The first metallic material has a rigidity greater than the second metallic material. The angle of the first metallic material to a free edge of the first metallic material, at an end portion of a joined surface between the first and second metallic materials, is greater than or equal to 120 degrees or in the range of from 55 degrees to 85 degrees. A reaction layer between the first and second metallic materials is more than zero and less than or equal to 20 μm. The first metallic material is copper. The second, which has the smaller rigidity, is aluminum.

26 Claims, 21 Drawing Sheets

JOINED STRUCTURE OF DISSIMILAR METALLIC MATERIALS

BACKGROUND OF THE INVENTION

1. Technical Field

The present invention relates generally to a joined structure of dissimilar metallic materials having different characteristics. More specifically, the invention relates to a joined structure of a current-carrying contact or arching contact which are used for, e.g., a power breaker, or a coating end structure of a metal base and a coating material for improving conductivity and heat resistance.

2. Description of the Prior Art

Conventionally, the friction welding or diffusion joining is carried out to join rod-like or tubular dissimilar metallic materials. Referring to FIG. 1, an example of joining of dissimilar metallic materials using the friction welding will be described. As shown in FIG. 1A, metallic materials 1 and 2 having different material characteristics, e.g., aluminum or an aluminum alloy and copper or a copper alloy, are clamped by a chuck of a pressure welding device. Then, one is rotated, and portions to be joined are heated by frictional energy to be upset-pressed by an axial welding pressure P to be joined to each other. As shown in FIG. 1B, the metallic materials 1 and 2 are joined to each other, so that the quantities and shapes of burrs 5 of the joined metallic materials 1 and 2 on the longitudinal sections are different from each other in accordance with the respective material strengths. Furthermore, in FIGS. 1A and 1B, 3 denotes a fixed shaft of the chuck of the friction welding device, and 4 is a rotating shaft thereof. In conventional joining of joints, there is a problem in that the reliability of the joined portion is low since the impact strength of the joined members is small. This tendency is the same as that in a joined structure of dissimilar materials using a joining method which uses any one of the cold welding, hot welding, diffusion joining, explosion welding, forge welding, ultrasonic joining, brazing, soldering, resistance welding and adhesive in addition to the above described friction welding.

Therefore, in conventional friction welding for dissimilar materials, the diameter of one of materials, which has a greater thermal expansion coefficient, is set to be greater than that of the other material to relieve residual stress generating on the joined interface to improve the joining strength (Japanese Patent Laid-Open No. 6-47570). In the hot welding of an aluminum material to a copper material, the convex copper material is allowed to butt the aluminum material at an included angle of 15 to 45 degrees to be joined thereto by the current-carrying heating to improve tensile strength (Japanese Patent Laid-Open No. 4-143085). In the joining of a ceramic to a metal, a ceramic forming angle of a part of a peripheral portion of a joined interface of a ceramic member to the surface of a body to be joined is set to be smaller than or equal to 80 degrees or greater than or equal to 100 degrees to relieve thermal stress (Japanese Patent Laid-Open No. 1-282166). In the joining of members having different thermal expansion coefficients, an edge portion of a joined interface of a member having a small thermal expansion coefficient is formed so as to have a curved surface having a greater radius than a predetermined value viewed from the joined interface, to relieve thermal stress (Japanese Patent Laid-Open No. 1-282167).

It is an object of the above described conventional methods to relieve residual stress and thermal stress and improve tensile strength, but it is not an object thereof to enhance the impact strength of the joined member and to enhance the reliability of the joined portion.

As described above, in the joining of dissimilar materials having different material characteristics, there is no problem as shown in FIGS. 2 and 3 with respect to static joint strength by optimizing the joining conditions. That is, the tensile strength of a joined member of dissimilar metals is not different between the central portion and the end portion of the joined surface. However, as shown in FIGS. 4 and 5, it is clear that the impact strength remarkably decreases at the end portion of the joined surface so that the impact strength of the whole joint is low. Therefore, there is a problem in that the impact strength of the joined member is low.

On the other hand, a coating material is coated on a metal base by the thermal spraying, PVD, CVD or the like to improve conductivity and heat resistance. When a metal base has a rigidity different from that of a coating material, e.g., when a coating material having a smaller rigidity than that of a metal base is coated on the metal base or when a coating material having a greater rigidity than that of a metal base is coated on the metal base, there is a problem in that the impact strength of the coated member comprising the metal base and the coating material is low to decrease reliability.

This tendency is the same as that in a coating structure obtained by any methods, such as welding, brazing, soldering and adhesive, in addition to the coating methods, such as thermal spraying, PVD and CVD.

SUMMARY OF THE INVENTION

It is therefore an object of the present invention to provide a joined structure which enhances the impact strength of a joined member and which has a high reliability, in the joining of dissimilar metallic materials having different material characteristics.

It is another object of the present invention to improve the impact strength of a coating member, which comprises a metal base and a coating material having a different material characteristic from that of the metal base, to provide a coating structure having a high reliability.

In order to accomplish the aforementioned and other objects, according to one aspect of the present invention, there is provided a joined structure of dissimilar metallic materials, one of which is joined to the other metallic material having a smaller rigidity than that of the one of metallic materials, wherein an angle of the one of metallic materials to a free edge of the one of metallic materials at an end portion of a joined surface between the metallic materials is greater than or equal to 120 degrees or in the range of from 55 degrees to 85 degrees.

According to another aspect of the present invention, there is provided a joined structure of dissimilar metallic materials, which comprises a contact portion of a current-carrying contact for use in a power breaker, the contact portion being made of copper or a copper alloy, and a remaining portion of the current-carrying contact other than the contact portion, the remaining portion being made of aluminum or an aluminum alloy, and wherein an angle of the contact portion of copper or the copper alloy to a free edge of the contact portion at an end portion of a joined surface between the contact portion and the remaining portion is greater than or equal to 120 degrees or in the range of from 55 degrees to 85 degrees.

According to another aspect of the present invention, there is provided a joined structure of dissimilar metallic materials, which comprises a contact portion of an arcing contact for use in a power breaker, the contact portion being made of a copper-tungsten alloy, and a remaining portion of the arcing contact other than the contact portion, the remaining portion being made of a material selected from the group consisting of iron, an iron alloy and a copper alloy, and wherein an angle of the contact portion of copper-tungsten alloy to a free edge of the contact portion at an end portion of a joined surface between the contact portion and the remaining portion is greater than or equal to 120 degrees or in the range of from 55 degrees to 85 degrees.

According to another aspect of the present invention, there is provided a joined structure of dissimilar metallic materials, one of which is joined to the other metallic material having a smaller rigidity than that of the one of metallic materials, wherein when both of angles of the one of metallic materials and the other metallic material to free edges of the respective metallic materials at an end portion of a joined surface between the metallic materials are smaller than 90 degrees.

According to another aspect of the present invention, there is provided a joined structure of dissimilar metallic materials, one of which is joined to the other metallic material having a smaller rigidity than that of the one of metallic materials, wherein when one of angles of the one of metallic materials and the other metallic material to free edges of the respective metallic materials at an end portion of a joined surface between the metallic materials is 90 degrees, the other of the angles of the one of metallic materials and the other metallic material to the free edges of the respective metallic materials at the end portion of the joined surface is smaller than 90 degrees.

According to another aspect of the present invention, there is provided a joined structure of dissimilar metallic materials, one of which is made of aluminum or an aluminum alloy and the other of which is made of copper or a copper alloy, the metallic materials being joined by the friction welding, wherein an angle of the other metallic material to a free edge of the other metallic material at an end portion of a joined surface is set to be in the range of from 50 degrees to 85 degrees.

According to another aspect of the present invention, there is provided a joined structure of dissimilar metallic materials, one of which is made of aluminum or an aluminum alloy and the other of which is made of copper or a copper alloy, the metallic materials being joined by the friction welding, wherein an angle of the other metallic material to a free edge of the other metallic material at an end portion of a joined surface is set to be greater than or equal to 120 degrees.

According to another aspect of the present invention, there is provided a joined structure of dissimilar metallic materials, one of which is made of aluminum or an aluminum alloy and the other of which is made of copper or a copper alloy, the metallic materials being joined by the friction welding, wherein angles of the metallic materials to a free edge of the other metallic material at an end portion of a joined surface are set to be smaller than 90 degrees.

According to another aspect of the present invention, there is provided a joined structure of dissimilar metallic materials, one of which is made of aluminum or an aluminum alloy and the other of which is made of copper or a copper alloy, the metallic materials being joined by the friction welding, wherein when one of angles of the metallic materials to free edges of the respective metallic materials at an end portion of a joined surface is 90 degrees, the other angle of the metallic materials to free edges of the respective metallic materials at the end portion of the joined surface is set to be smaller than 90 degrees.

According to another aspect of the present invention, there is provided a coating end structure comprising: a recessed metal base; and a coating member of a coating material which has a smaller rigidity than that of the metal base and which is coated on the metal base, wherein an angle of the metal base to a free edge at the coating end portion is greater than or equal to 120 degrees or in the range of from 55 degrees to 85 degrees.

According to another aspect of the present invention, there is provided a coating end structure comprising: a recessed metal base; and a coating member of a coating material which has a greater rigidity than that of the metal base and which is coated on the metal base, wherein an angle of the metal base to a free edge at the coating end portion is smaller than or equal to 60 degrees or in the range of from 95 degrees to 125 degrees.

According to another aspect of the present invention, there is provided a coating end structure of a current-carrying part for use in a power breaker having a coating structure comprising a recessed contact body and a contact portion coated on the contact body, wherein the contact body is made of a metal base, and the coating portion is made of a coating material having a smaller rigidity than that of the metal base, and wherein an angle of the metal base to a free edge at the coating end portion is smaller than or equal to 60 degrees or in the range of from 95 degrees to 125 degrees.

According to another aspect of the present invention, there is provided a coating end structure of a conductor for use in a power breaker or switch having a coating structure comprising a recessed conductor body and a conductor contact portion coated on the conductor body, wherein the conductor body is made of a metal base, and the conductor contact portion is made of a coating base having a greater rigidity than that of the metal base, and wherein an angle of the metal base to a free edge at the coating end portion is smaller than or equal to 60 degrees or in the range of from 95 degrees to 125 degrees.

According to a further aspect of the present invention, there is provided a coating end structure of a moving blade or a combustor for use in a gas turbine having a coating structure comprising a recessed body and a corrosion resisting portion coated on the body, wherein the body is made of a base metal, and the corrosion resisting portion is a coating material having a smaller rigidity than that of the metal base, and wherein an angle of the metal base to a free edge at the coating end portion is greater than or equal to 120 degrees or in the range of from 55 degrees to 85 degrees.

According to a still further aspect of the present invention, there is provided a coating end structure of a moving blade or a combustor for use in a gas turbine having a coating structure comprising a recessed body and a corrosion resisting portion coated on the body, wherein the body is made of a base metal, and the corrosion resisting portion comprises a bond coat material and a topcoat material which have a smaller rigidity than that of the metal base, and wherein an angle of the metal base to a free edge at the coating end portion is greater than or equal to 120 degrees or in the range of from 55 degrees to 85 degrees.

According to the present invention, it is possible to provide a joined structure having a high impact strength and a high reliability by setting an angle of dissimilar metallic materials having different rigidities to a free edge at the end portion of the joined surface to a specific range or by setting an angle of a copper alloy to a free edge at the end portion of the joined surface so as to decrease stress concentration at the joined portion in a joined structure of an aluminum alloy and the copper alloy which are friction welded to each other.

According to the present invention, it is also possible to provide a coating end structure having a high impact strength and a high reliability by setting an angle of a metal base to a free edge at the coating end portion of a coating member, which comprises the metal base and a coating material having a smaller rigidity than that of the metal base, to a specific range.

BRIEF DESCRIPTION OF THE DRAWINGS

The present invention will be understood more fully from the detailed description given hereinbelow and from the accompanying drawings of the preferred embodiments of the invention. However, the drawings are not intended to imply limitation of the invention to a specific embodiment, but are for explanation and understanding only.

In the drawings.

DETAILED DESCRIPTION OF THE PREFERRED EMBODIMENTS

Preferred embodiments of the present invention will be described below.

EXAMPLE 1

A joined structure, which is obtained by friction welding a copper material to an aluminum material as metallic materials having different characteristics, will be described.

Figure 6C:
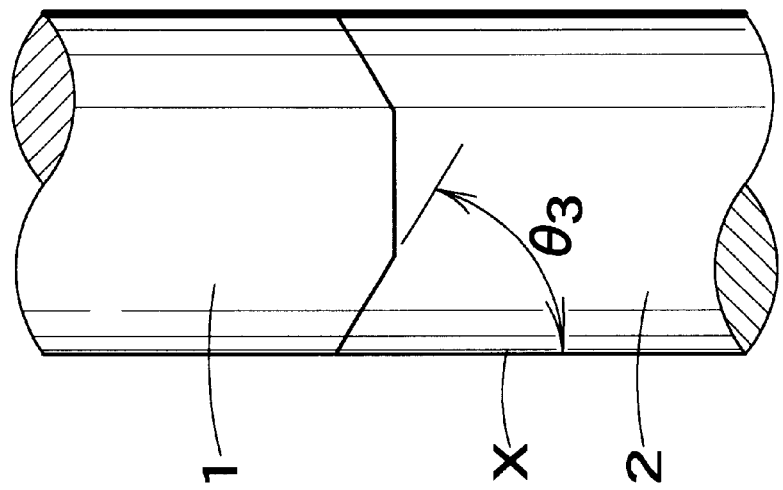
FIGS. 6A through 6C are views, each showing the joined structures of rod-like dissimilar metallic materials.
Figure 6B:
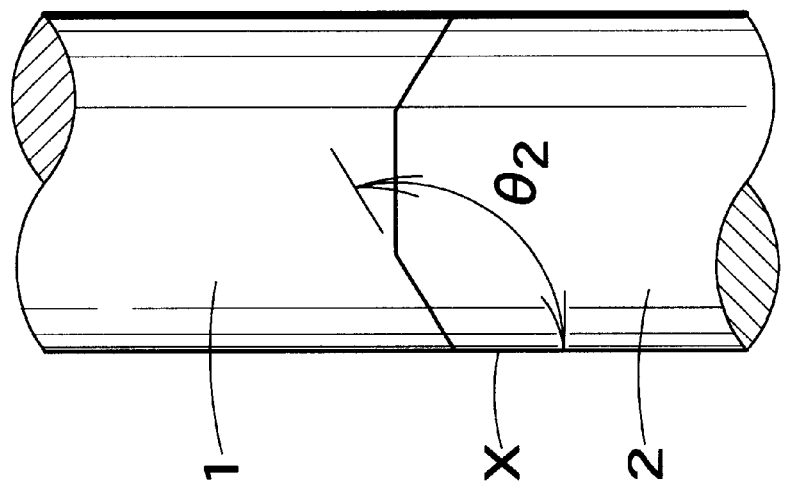
Figure 6A:
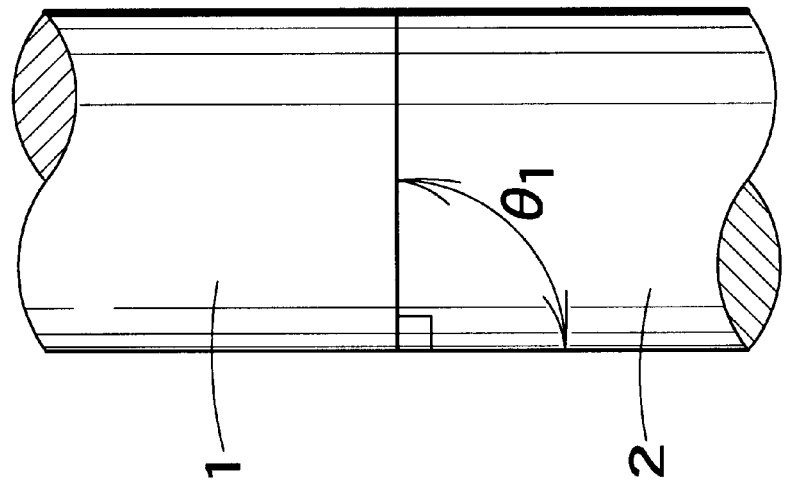
Figure 7C:
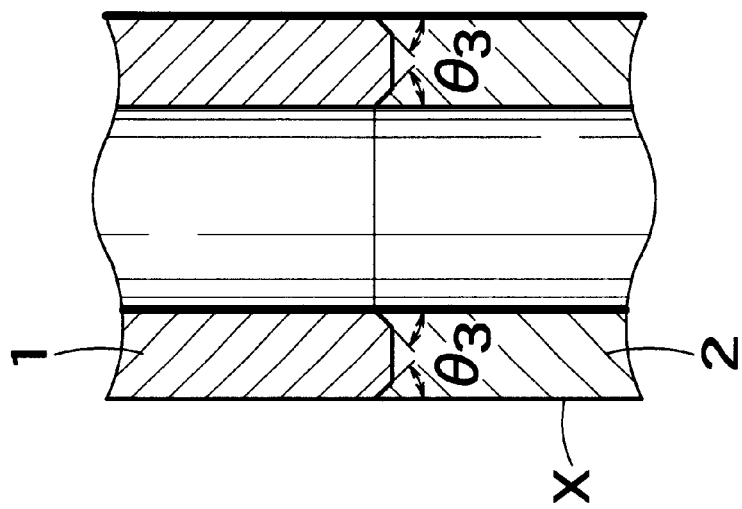
FIGS. 7A through 7C are views, each showing the joined structures of tubular dissimilar metallic materials.
Figure 7B:
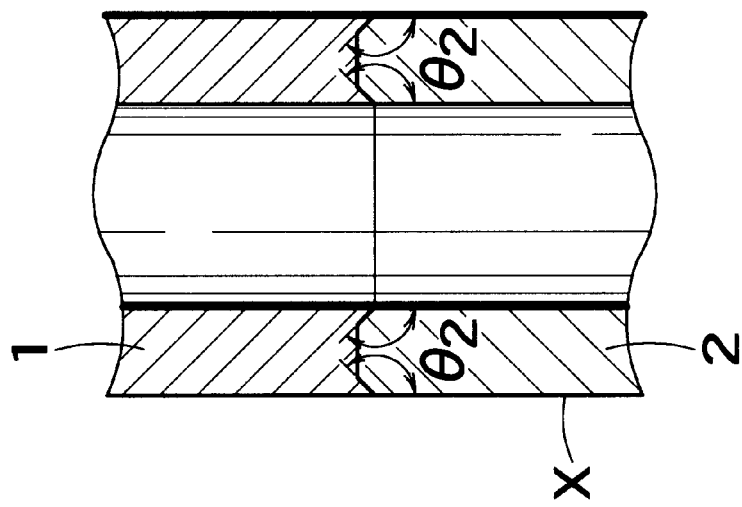
Figure 7A:
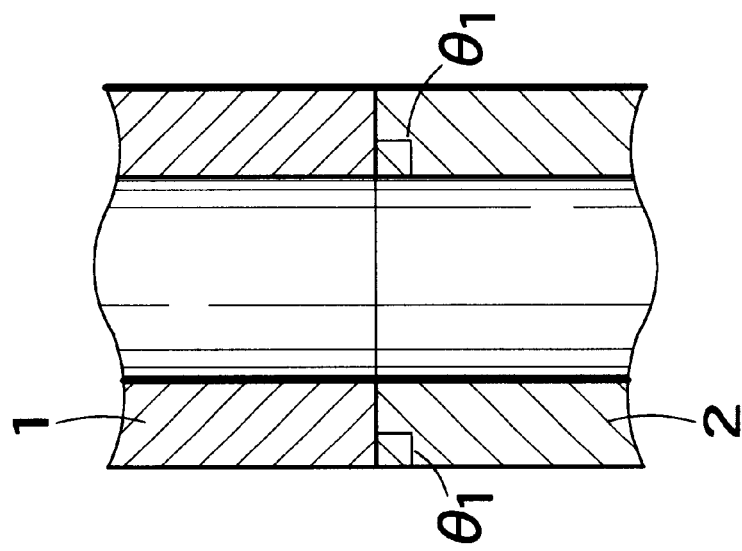

Each of FIGS. 6A through 6C shows a joined structure of rod-like dissimilar metallic materials 1, 2, and each of FIGS. 7A through 7C shows a joined structure of tubular dissimilar metallic materials 1, 2. In the joined structure of the metallic material 2 and the metallic material 1 having a smaller rigidity than that of the metallic material 2, an angle $\theta_2$ of the metallic material 2 to a free edge X at the end portion of the joined surface of the metallic material 2 was set to be greater than or equal to 120 degrees as shown in FIGS. 6B and 7B, or an angle $\theta_3$ of the metallic material 2 to the free edge X at the end portion of the joined surface of the metallic material 2 was set to be in the range of from 55 degrees to 85 degrees as shown in FIGS. 6C and 7C. In FIGS. 6A through 6C and 7A through 7C, although the joined surface is formed by straight lines, it may be formed by curved lines as long as the angle of a tangent of the curved lines to the free edge is greater than or equal to 120 degrees or in the range of from 55 degrees to 85 degrees. It is possible to obtain remarkably advantageous effects if the angle of the copper material to the free edge at the end portion of the joined surface is greater than or equal to 5% of the diameter ($\geq 0.05$ D1) from the edge portion of the joined surface.

Figure 8:
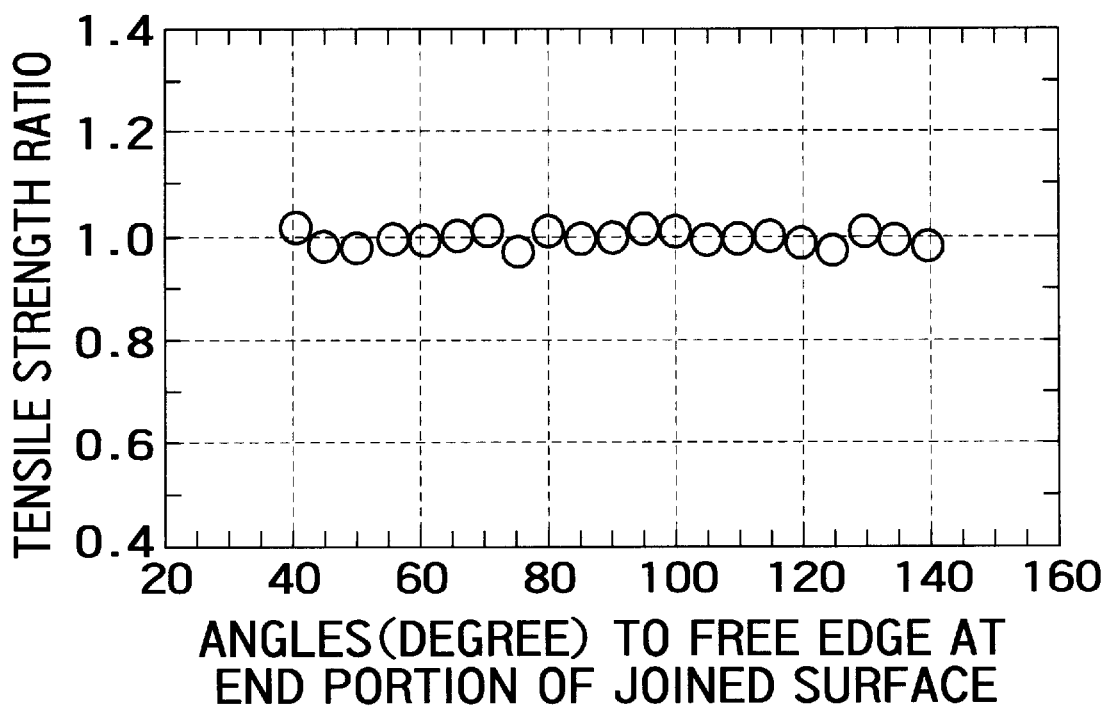
FIG. 8 is a graph showing the tensile strength ratios at respective angles assuming that the tensile strength is 1 when the angle of a copper material and an aluminum material to the free edge X at the end portion of the joined surface between the copper material and the aluminum material is 90 degrees.
Figure 9:
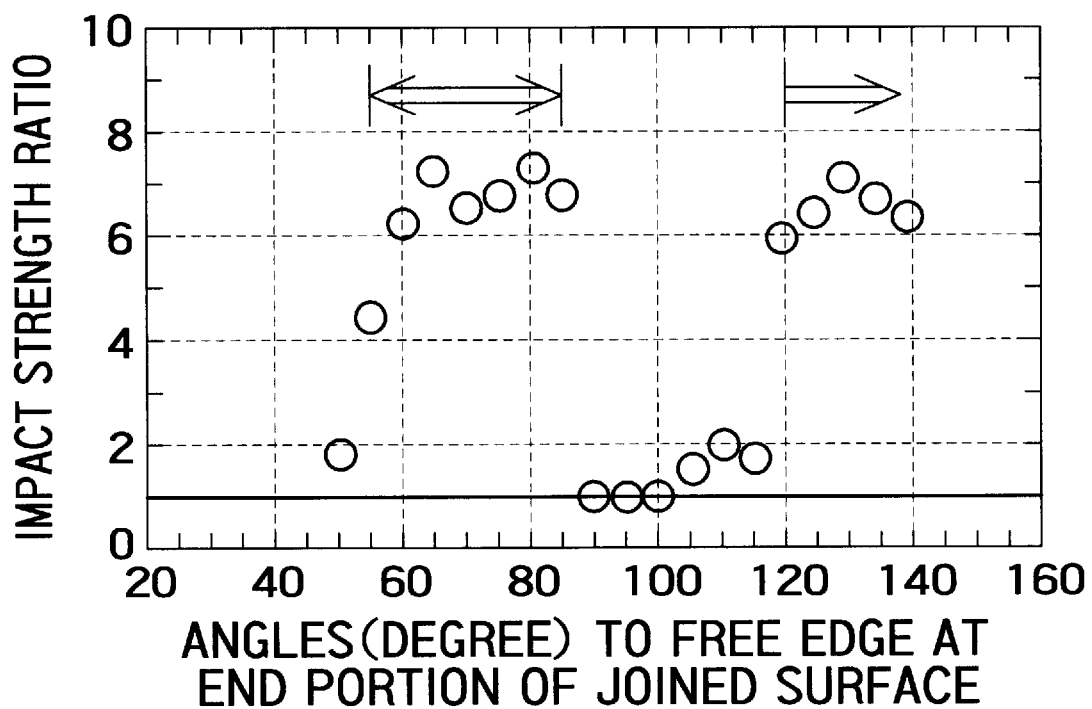
FIG. 9 is a graph showing the impact strength ratios at respective angles assuming that the impact strength is 1 when the angle of a copper material and an aluminum material to the free edge X at the end portion of the joined surface between the copper material and the aluminum material is 90 degrees.

Various metallic materials 2 were made so that the angles of the metallic material 2 to the free edge X at the end portion of the joined surface vary from 40 degrees to 140 degrees at intervals of 5 degrees, and the tensile and impact tests of the respective metallic materials 2 were carried out. FIG. 8 shows the tensile strengths at various angles assuming that the tensile strength is 1 when the angle of the metallic material 2 to the free edge X at the end portion of the joined surface is 90 degrees. FIG. 9 shows the impact strengths at various angles assuming that the impact strength is 1 when the angle of the metallic material 2 to the free edge X at the end portion of the joined surface is 90 degrees.

As shown in FIG. 8, the tensile strength was constant regardless of the angle of the metallic material 2 to the free edge X at the end portion of the joined surface. However, as shown in FIG. 9, when the angle of the metallic material 2 to the free edge X at the end portion of the joined surface of the metallic material 2 was greater than or equal to 120 degrees or in the range of from 55 degrees to 85 degrees, the impact strength was higher than that at a conventional angle of 90 degrees.

When the angle of the metallic material to the free edge X at the end portion of the joined surface of the metallic material was set to be greater than or equal to 120 degrees or in the range of from 55 degrees to 85 degrees, the tensile strength was higher than that at a conventional angle of 90 degrees, with respect to any joining means, such as cold welding, hot welding, diffusion joining, explosion welding, forge welding, ultrasonic joining, brazing, soldering, resistance welding and adhesive, in addition to the friction welding.

In a joining member for joining dissimilar materials, such as an aluminum material and a titanium material, an aluminum material and a steel product, and a copper material and a copper-chromium alloy, when the angle of a material having a higher rigidity, i.e., the titanium material (in the case of the aluminum material and the titanium material), the steel product (in the case of the aluminum material and the steel product), or the copper-chromium alloy (in the case of the copper material and the copper-chromium alloy), to the free edge at the end portion of the joined surface was set to be greater than or equal to 120 degrees or in the range of from 55 degrees to 85 degrees, the tensile strength was higher than that at a conventional angle of 90 degrees.

EXAMPLE 2

Figure 10:
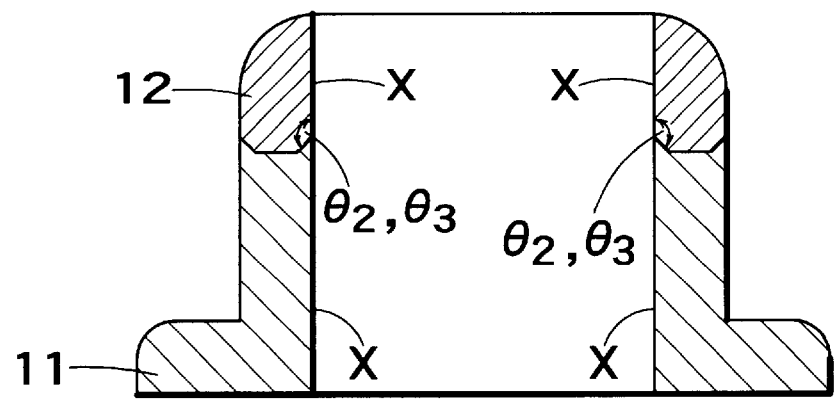
FIG. 10 is a view showing a schematic structure of a current-carrying contact of a power breaker using a joined structure of dissimilar metallic materials according to the present invention.

FIG. 10 shows a preferred embodiment of a jointed structure of dissimilar metallic materials applied to a current-carrying contact material of a power breaker according to the present invention. When the current-carrying contact is closed, the fixed contact is in contact with the moving contact. When the current-carrying contact is open, the moving current-carrying contact is connected to the operation mechanism portion and disconnected from the fixed contact. In general, the moving current-carrying contact is made of an aluminum material having a light weight and a high current-carrying rate, so that a portion of the current-carrying contact near the contact portion is fused and damaged by minute arc produced when the moving contact leaves the fixed contact. The fused and damaged portion increases in size as the number of open and closing operations increases, and the current breaking characteristic deteriorates when the contact is closed. This tendency further increases when the current-carrying contact decreases in size.

In this preferred embodiment, as shown in FIG. 10, there was used a joined structure of dissimilar metallic materials, which comprises a contact portion 12 of a moving current-carrying contact made of a copper material having a higher melting point and a higher conductivity than those of an aluminum material, and a remaining portion 11 of aluminum. In the end portion of the joined surface between the copper material and the aluminum material which were friction welded to each other, the angle of the copper material to the free edge thereof was set to be greater than or equal to 120 degrees ($\theta_2$) or in the range of from 55 degrees to 85 degrees ($\theta_3$).

A conventional friction welded member of a copper material and an aluminum material has a low impact strength, and the joined structure thereof has a low reliability, so that a copper-aluminum current-carrying contact having a high conductivity can not be applied thereto. However, the joined structure of the present invention can be used in place of a conventional current-carrying contact of an aluminum material. That is, when the material of the contact portion of the moving current-carrying contact was replaced with a copper material and when the remaining portion thereof was made of a conventional light aluminum material, it was possible to obtain a current-carrying contact which had a high conductivity, a low fused loss and a light weight and which could suitably carry out heavy-current opening and closing even if the diameter was reduced to half of a conventional diameter. This effect can be also obtained when the contact portion of the contact is made of a copper material or a copper alloy and when the remaining portion is made of an aluminum material or an aluminum alloy.

When the joined surface is close to the contact portion, the joined surface is damaged by heat of arc produced by the opening and closing of the contact to deteriorate impact strength, so that the joined surface is preferably apart from the contact portion. In addition, when the electrical resistance at the joined portion is high, the joined portion is heated in the welding time, so that the diffusion joining layer grows to deteriorate strength. Therefore, the electrical resistance at the joined portion is preferably the same as the electrical resistance of the base metal.

EXAMPLE 3

Figure 11:
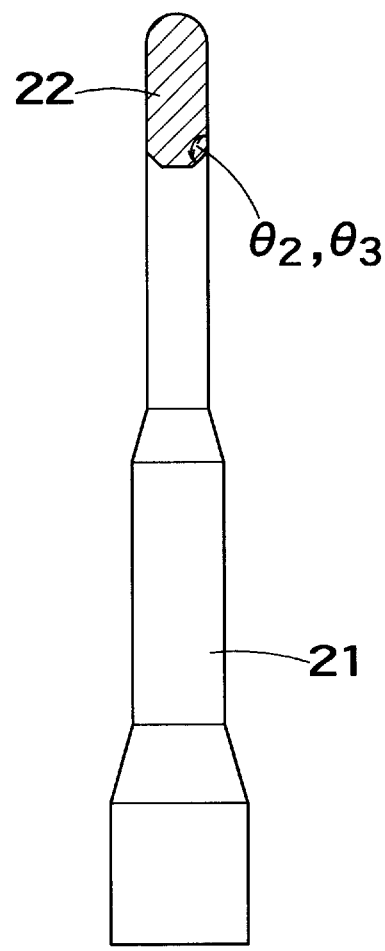
FIG. 11 is a view showing a schematic structure of an arcing contact of a power breaker using a joined structure of dissimilar metallic materials according to the present invention.

FIG. 11 shows a preferred embodiment of a joined structure of dissimilar metallic materials according to the present invention, which is applied to fixed and moving arcing contacts of a power breaker.

When the arching contact is closed, the fixed and moving contacts thereof are in contact with each other. When the arching contact is open, the moving arching contact is connected to the operation mechanism portion and apart from the fixed arching contact. In general, the contact portion of the arching contact is made of a copper-tungsten alloy of arc-resistance, the remaining portion thereof is made of a copper-chromium alloy, and the joined portion is silver brazed. This joined portion has an electrical resistance three times as large as that of a copper-tungsten alloy and a melting point half that of a copper-chromium alloy. Therefore, the size of the arcing contact is decreased, the silver braze of the joined portion is melted by high-temperature heat caused by heavy-current arc produced when the moving contact is disconnected from the fixed contact. Therefore, the size of the conventional arcing contact can not be decreased.

In this preferred embodiment, the joined structure comprises a contact portion 22 of an arcing contact made of a copper-tungsten alloy of arc-resistance, and a remaining portion 21 of the arcing contact made of a copper-chromium alloy. That is, as shown in FIG. 11, there was used a joined structure of dissimilar metallic materials wherein the angle of the copper-tungsten alloy to the free edge X at the end portion of the joined surface between the copper-chromium alloy 21 and the copper-tungsten alloy 22 having a higher rigidity than that of the copper-chromium alloy 21, which were friction welded to each other, was set to be greater than or equal to 120 degrees ($\theta_2$) or in the range of from 55 degrees to 85 degrees ($\theta_3$).

Thus, the impact strength of the joined structure was improved, and the size of the arcing contact was decreased.

EXAMPLE 4

As an example of joining of dissimilar metallic materials having different characteristics using the friction welding, joined members of a copper material and an aluminum material having a smaller rigidity than that of the copper material will be described.

Figure 12A:
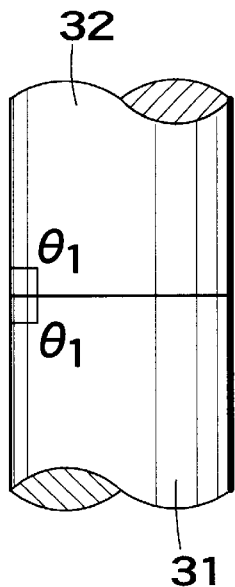
FIGS. 12A through 12E are views, each showing a joined structure of a joint of rod-like dissimilar metallic materials according to the present invention.
Figure 12B:
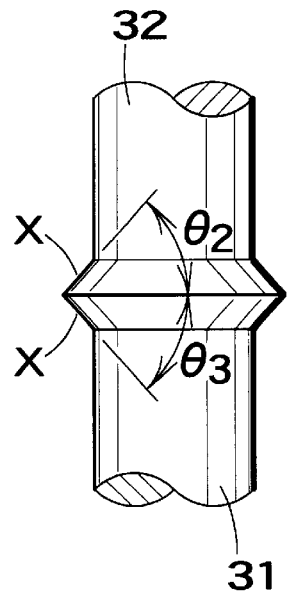
Figure 12D:
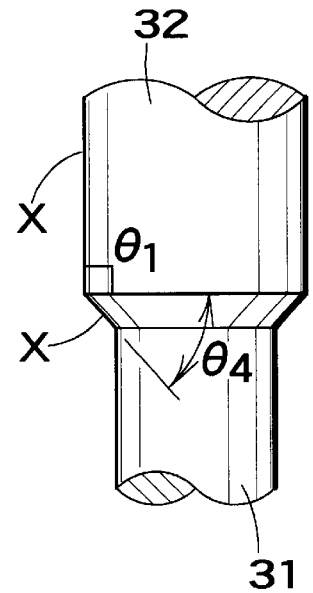
Figure 12C:
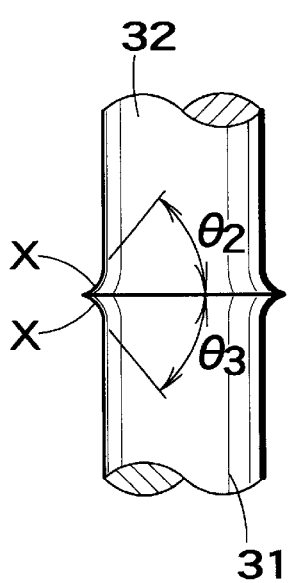
Figure 12E:
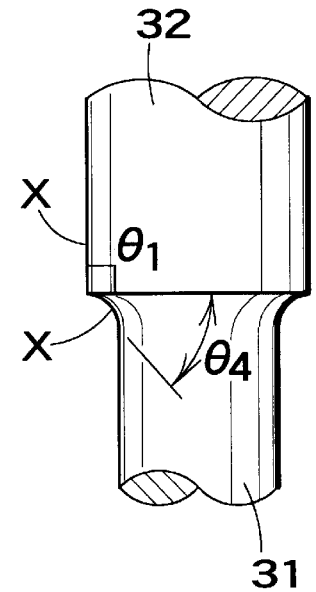
Figure 13A:
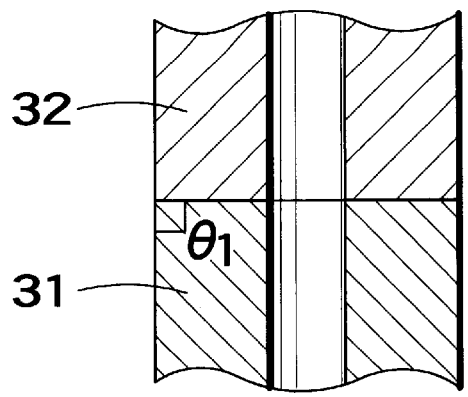
FIGS. 13A through 13E are views, each showing a preferred embodiment of a joined structure of joints of pipe-like dissimilar metallic materials according to the present invention.
Figure 13B:
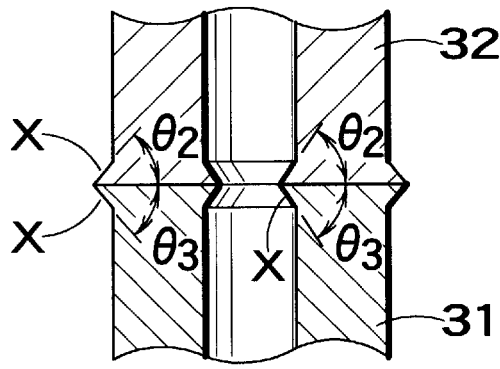
Figure 13D:
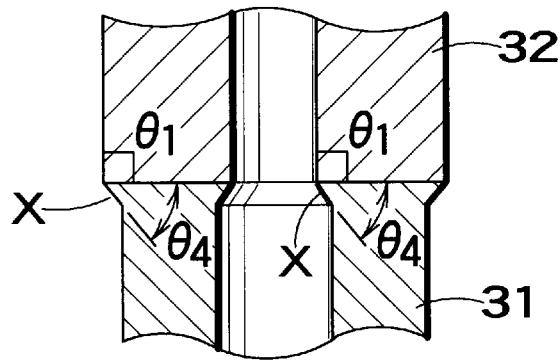
Figure 13C:
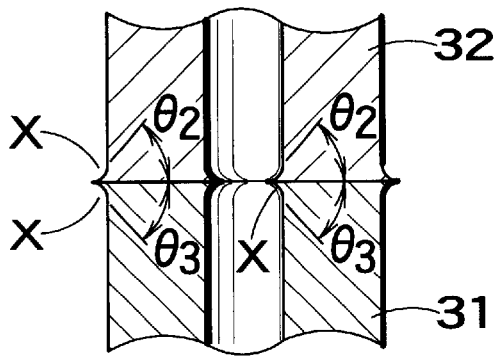
Figure 13E:
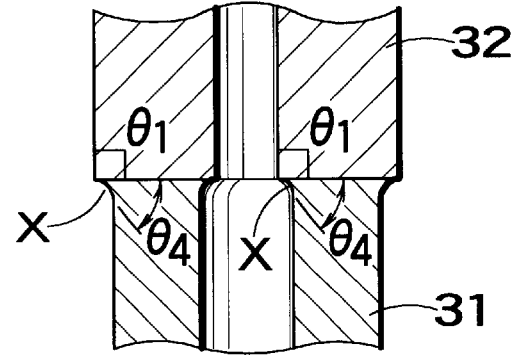

Each of FIGS. 12A through 12E shows a joined structure of a joint of rod-like dissimilar metallic materials, and each of FIGS. 13A through 13E shows a joined structure of a joint of pipe-like dissimilar metallic materials. FIG. 12A and FIG. 13A show conventional rod-like and pipe-like joined structures, respectively.

As shown in FIGS. 12B, 12C, 13B and 13C, the angles $\theta_2$ and $\theta_3$ of the copper material 21 and the aluminum material 32 having a smaller rigidity than that of the copper material 21 to the free edge X at the end portion of the joined surface between the copper material 31 and the aluminum material 32 were set to be smaller than 90 degrees. In addition, as shown in FIGS. 12D, 12E, 13D and 13E, when the angles $\theta_1$ of one of the copper material 31 and the aluminum material 32 having a smaller rigidity than that of the copper material 31 to the free edge X at the end portion of the joined surface between the copper material 31 and the aluminum material 32 was 90 degrees, the angle $\theta_4$ of another metallic material to the free edge X at the end portion of the joined surface was set to be smaller than 90 degrees.

Figure 1A:
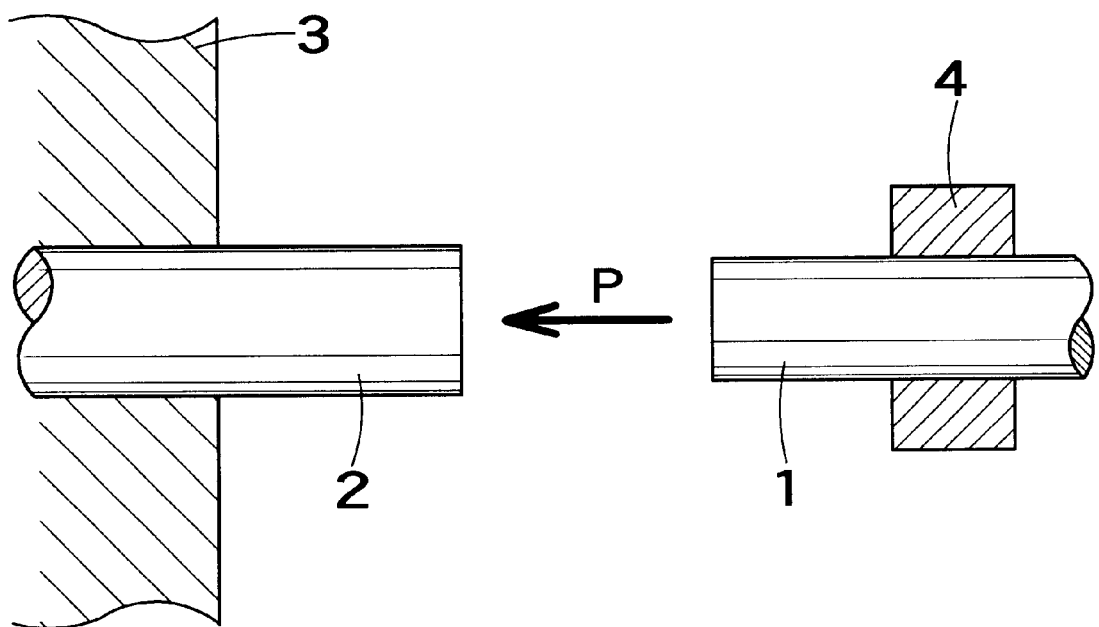
FIG. 1A is a schematic view showing the joining of dissimilar metallic materials using a conventional friction welding.
Figure 1B:
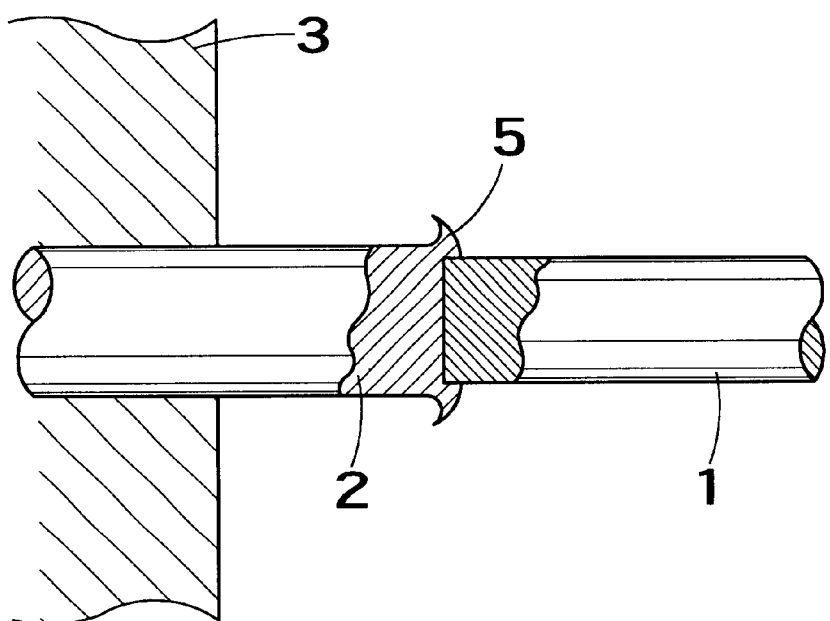
FIG. 1B is a longitudinal section of joined dissimilar metallic materials.
Figure 2:
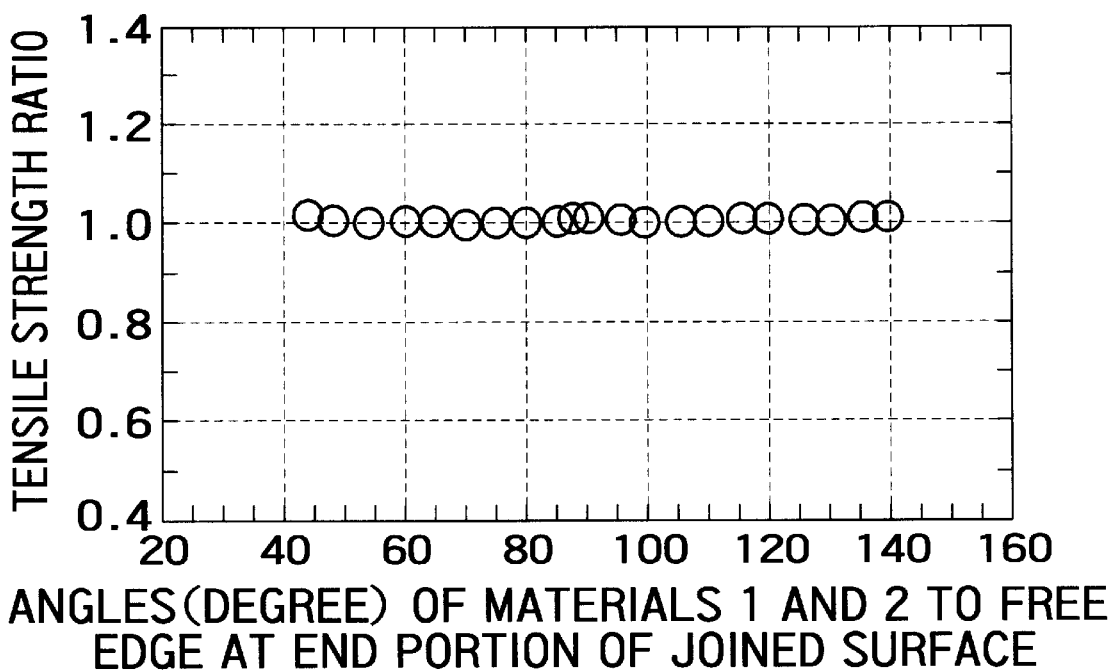
FIG. 2 is a graph showing the relationship between the angle of dissimilar metallic materials 1, 2 to the free edge at the end portion of the joined surface between the metallic materials, and the tensile strength.
Figure 3:
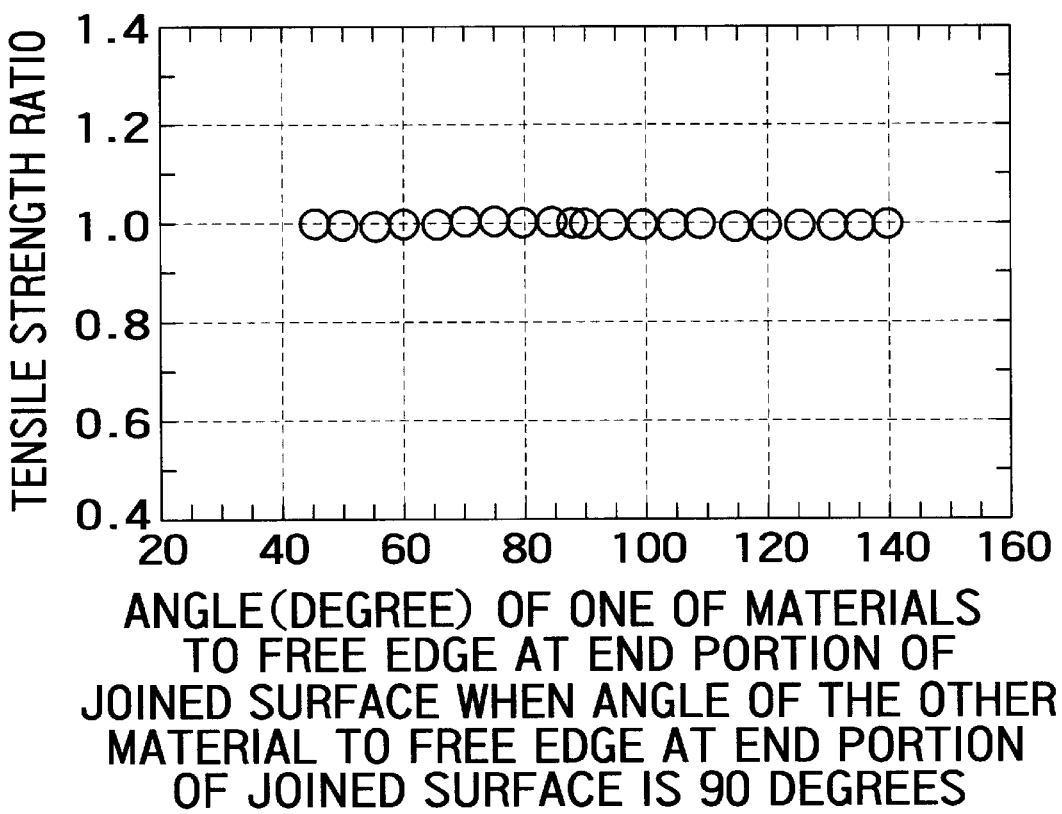
FIG. 3 is a graph showing the relationship between the angle of one of dissimilar metallic materials 1, 2 to the free edge at the end portion of the joined surface between the metallic materials, and the tensile strength when the angle of the other metallic material to the free edge at the end portion of the joined surface between the metallic materials is 90 degrees.
Figure 4:
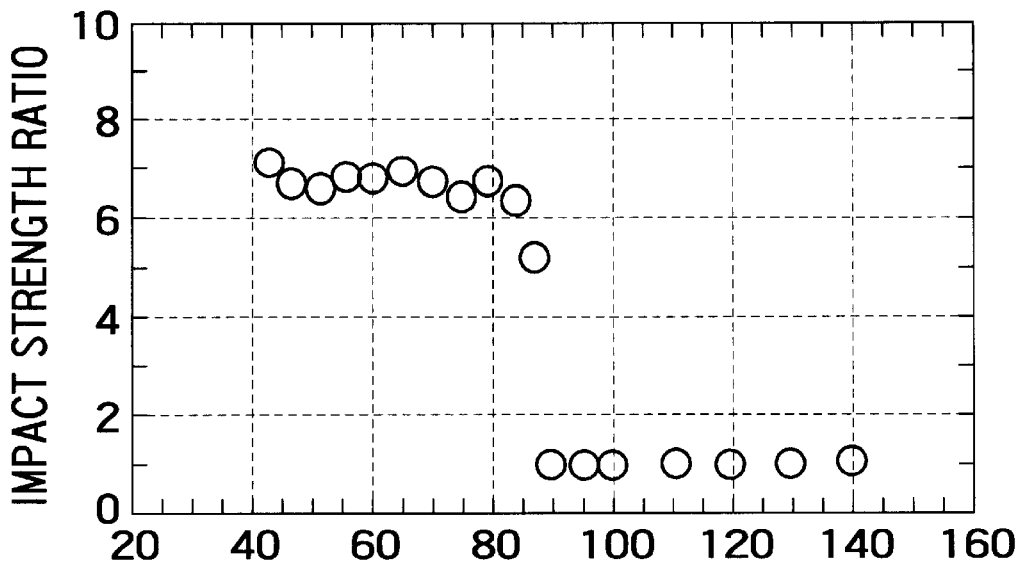
FIG. 4 is a graph showing the relationship between the angle of dissimilar metallic materials 1, 2 to the free edge at the end portion of the joined surface between the metallic materials, and the impact strength.
Figure 5:
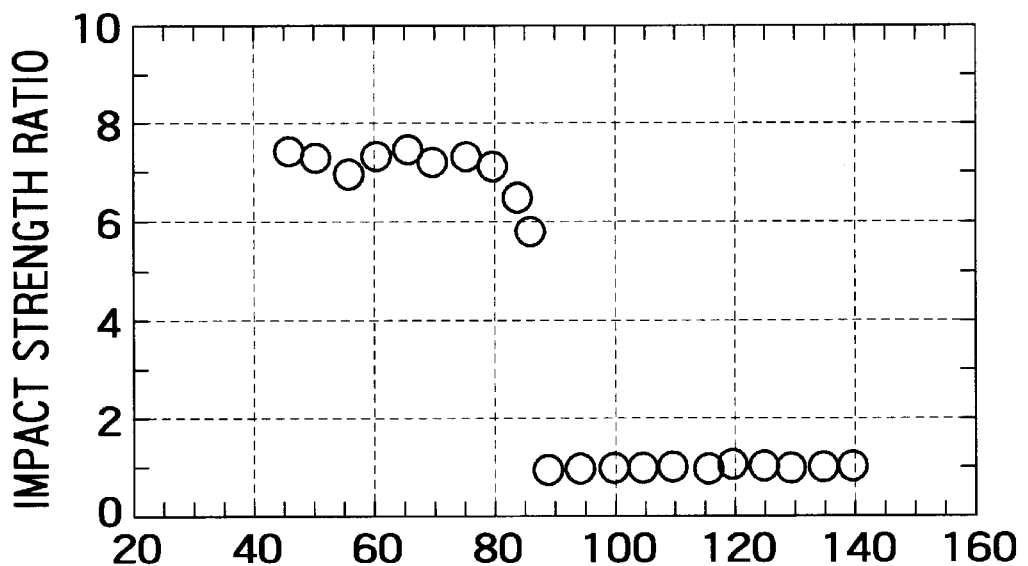
FIG. 5 is a graph showing the relationship between the angle of one of dissimilar metallic materials 1, 2 to the free edge at the end portion of the joined surface between the metallic materials, and the impact strength when the angle of the other metallic material to the free edge at the end portion of the joined surface between the metallic materials is 90 degrees.

Various joined members were prepared so that the angles of a copper material and an aluminum material to the free edge at the end portion of the joined surface between the copper material and the aluminum material was in the range of from 40 degrees to 140 degrees, and the tensile and impact tests thereof were carried out. The tensile test results are shown in FIGS. 2 and 3, and the impact test results are shown in FIGS. 4 and 5. Furthermore, the tensile strength ratio and the impact strength ratio are strengths assuming that the strength is 1 at 90 degrees.

As shown in FIGS. 2 and 3, the tensile strength was constant regardless of the angles of the copper material and the aluminum material to the free edge at the end portion of the joined surface. However, when both of the angles of the copper material and the aluminum material to the free edge at the end portion of the joined surface were smaller than 90 degrees (FIG. 4) or when one of the angles of the copper material and the aluminum material was 90 degrees (FIG. 5) and when the angle of the other material to the free edge at the end portion of the joined surface was smaller than 90 degrees, the impact strength was higher than that at a conventional angle of 90 degrees.

There was such a tendency in any one of joining methods using the cold welding, hot welding, diffusion joining, explosion welding, ultrasonic joining, brazing, soldering, resistance welding, molten metal injection, cast joint and adhesive, in addition to the friction welding. In addition, when both of the angles of the metallic materials at the end portion of the joined surface between one of the metallic materials and the other metallic material having a smaller rigidity than that of the one of the metallic materials were smaller than 90 degrees, or when the angle of one of the metallic materials to the free edge at the end portion of the joined surface was 90 degrees and when the angle of the other metallic material to the free edge at the end portion of the joined surface was smaller than 90 degrees, the impact strength was higher than that at a conventional angle of 90 degrees.

Also in the joined structure of dissimilar metallic materials, such as an aluminum material and a titanium material, an aluminum material and a steel product, and a copper material and a copper-chromium alloy, when both of the angles of a material having a greater rigidity, i.e., the titanium material (in the case of the aluminum material and the titanium material), the steel product (in the case of the aluminum material and the steel product) or the copper-chromium alloy (in the case of the copper material and the copper-chromium alloy), to the free edges at the end portion of the joined surface were smaller than 90 degrees, or when one of the angles was 90 degrees and when the angle of the other material to the free edges at the end portion of the joined surface is smaller than 90 degrees, the impact strength was higher than that at a conventional angle of 90 degrees.

EXAMPLE 5

Figure 14A:
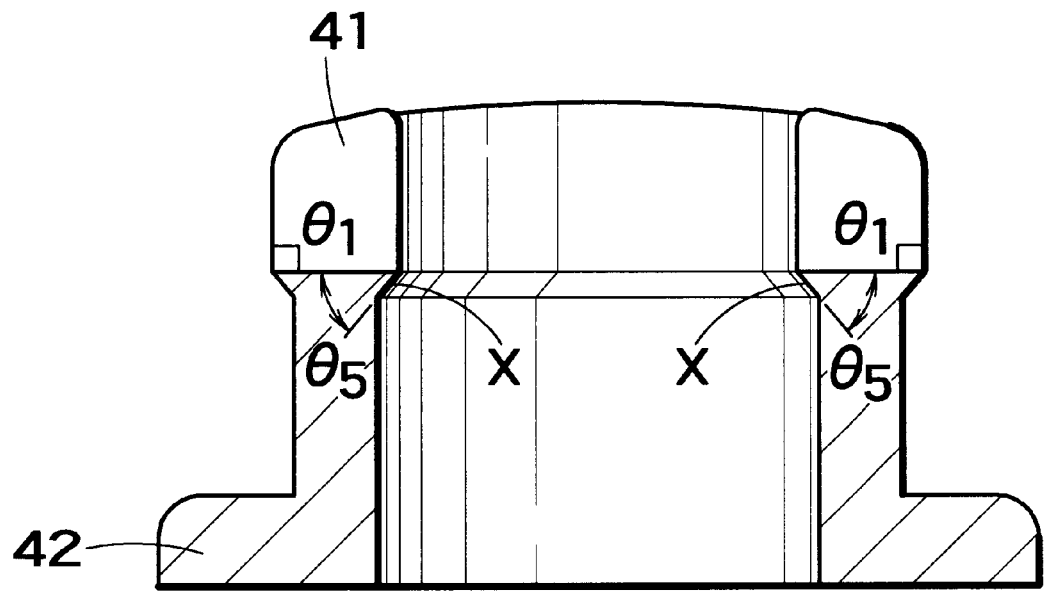
FIGS. 14A and 14B are views, each showing a schematic structure of a current-carrying contact of a power breaker adopting a joined structure of dissimilar metallic materials according to the present invention.
Figure 14B:
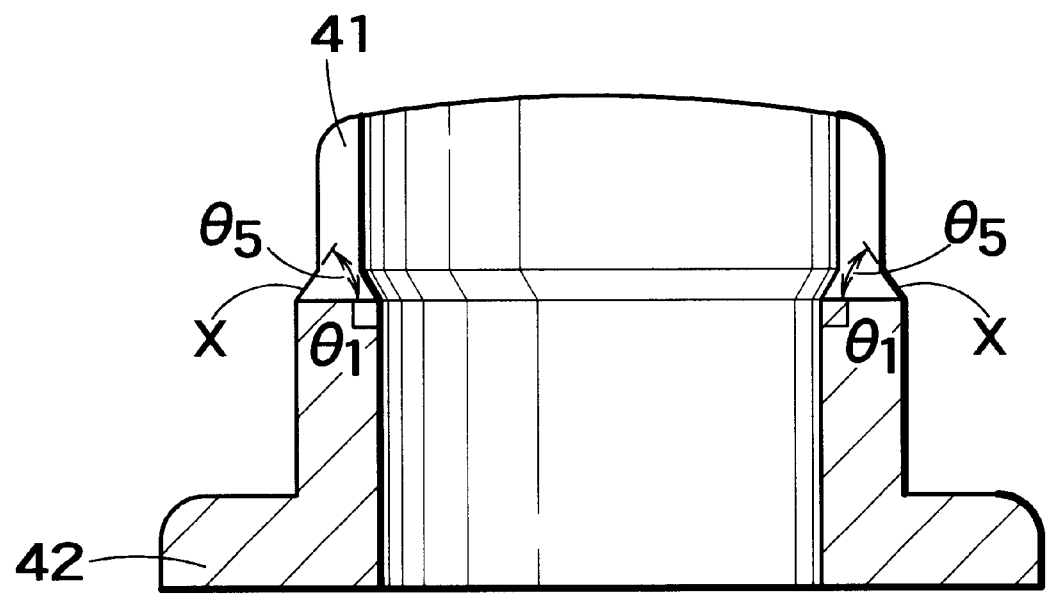

Each of FIGS. 14A and 14B shows a preferred embodiment of a jointed structure of dissimilar metallic materials applied to a current-carrying contact material of a power breaker according to the present invention. When the current-carrying contact is closed, the fixed contact is in contact with the moving contact. When the current-carrying contact is open, the moving current-carrying contact is connected to an operation mechanism portion and disconnected from the fixed contact. In general, the moving current-carrying contact 2 is made of an aluminum material having a light weight and a high conductivity, and a portion of the contact near the contact portion is fused and damaged by minute arc produced when the moving contact leaves the fixed contact. The fused and damaged portion increases in size as the number of open and closing operations increases, and the current breaking characteristic deteriorates when the contact is closed. This tendency further increases when the current-carrying contact decreases in size.

In this preferred embodiment, as shown in FIG. 14, there was used a joined structure of dissimilar metallic materials comprising a contact portion 41 of a moving current-carrying contact made of a copper material having a higher melting point and a higher conductivity than those of an aluminum material, and a remaining portion 42 of the aluminum material. The angles of the copper material and the aluminum material to the free edges of the respective materials at the end portion of the joined surface between the copper and aluminum materials, which were friction welded, were set to be smaller than 90 degrees, or when one of the angles was 90 degrees ($\theta_1$), the angle of the remaining material to the free edge thereof at the end portion of the joined surface was set to be smaller than 90 degrees ($\theta_5$). A conventional friction welded member of a copper material and an aluminum material has a low impact strength and, and the joined structure thereof has a low reliability, so that a copper-aluminum current-carrying contact having a high conductivity can not be applied thereto. However, the joined structure of the present invention can be used in place of a conventional current-carrying contact of an aluminum material.

The material of the contact portion of the moving current-carrying contact was replaced with a copper material, and the remaining portion thereof was made of a conventional light aluminum material, so that it was possible to obtain a current-carrying contact which had a high conductivity, a low fused loss and a light weight and which could suitably carry out heavy-current opening and closing even if the diameter was reduced to half of a conventional diameter. This effect can be also obtained when the contact portion of the contact is made of a copper material or a copper alloy and when the remaining portion is made of an aluminum material or an aluminum alloy.

When the joined surface between dissimilar metallic materials is close to the contact portion of the current-carrying contact, the joined surface is damaged by heat of arc caused when the contact is open and closed, so that the impact strength deteriorates. Therefore, the joined surface is preferably apart from the contact portion. In addition, when the electrical resistance at the joined portion is high, the joined portion is heated in welding time, so that the diffusion joining layer grows to deteriorate strength. Therefore, the electrical resistance at the joined portion is preferably the same as the electrical resistance of the base metal.

EXAMPLE 6

Figure 15A:
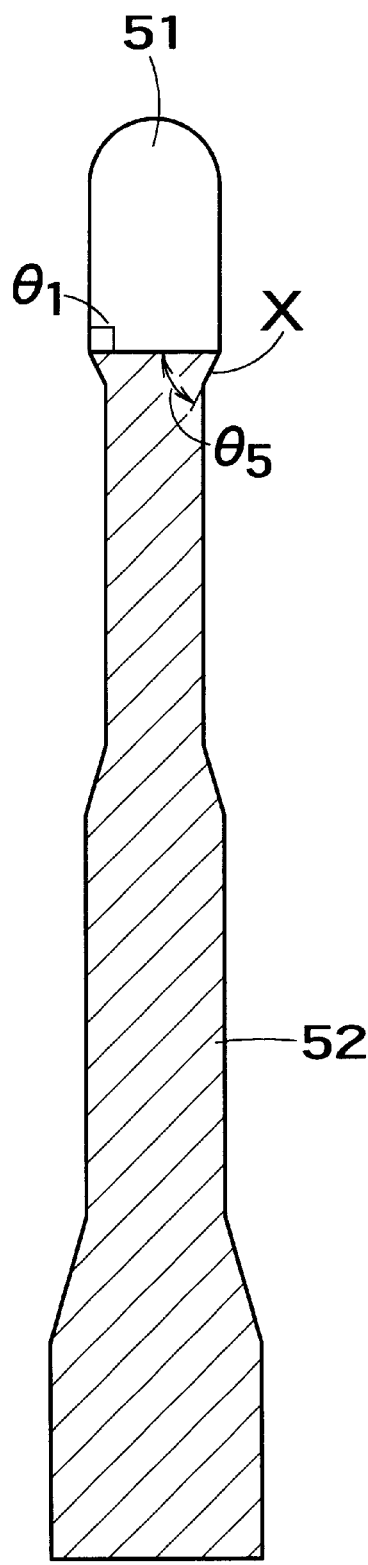
FIGS. 15A and 15B are views, each showing a schematic structure of an arcing contact of a power breaker adopting a joined structure of dissimilar metallic materials according to the present invention.
Figure 15B:
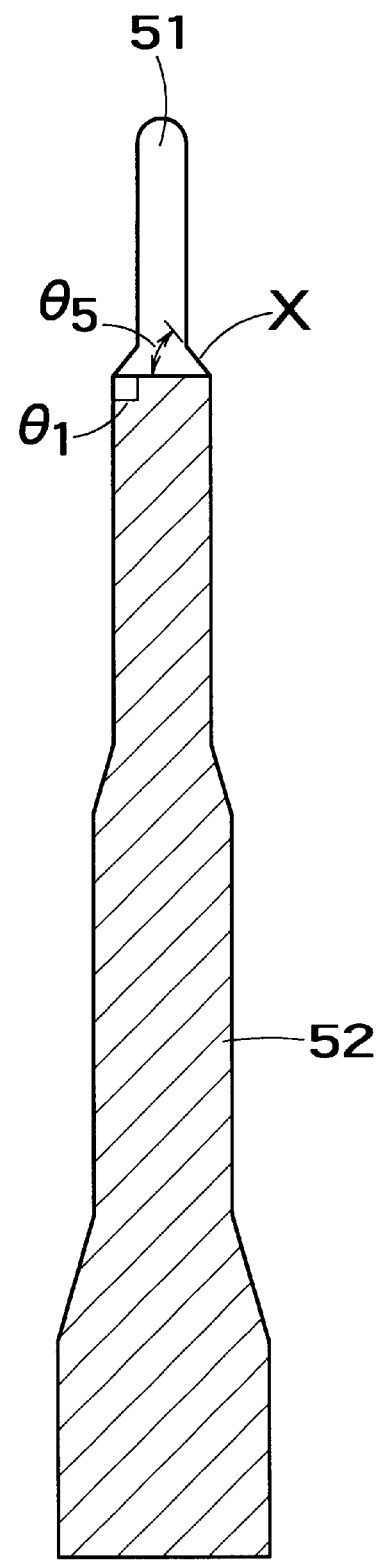

FIG. 15 shows a preferred embodiment of a joined structure of dissimilar metallic materials according to the present invention, which is applied to fixed and moving arcing contacts of a power breaker.

When the arching contact is closed, the fixed and moving contacts thereof are in contact with each other. When the arching contact is open, the moving arching contact is connected to the operation mechanism portion and apart from the fixed arching contact. In general, the contact portion of the arching contact is made of a copper-tungsten alloy of arc-resistance, the remaining portion thereof is made of a copper-chromium alloy, and the joined portion is silver brazed. This joined portion has an electrical resistance three times as large as that of a copper-tungsten alloy and a melting point half that of a copper-chromium alloy. Therefore, if the arcing contact is decreased in size, the silver braze of the joined portion is melted by high-temperature heat caused by heavy-current arc produced when the moving contact is disconnected from the fixed contact.

In this preferred embodiment, there was used a joined structure comprising a contact portion 51 of an arcing contact made of a copper-tungsten alloy of arc-resistance and a remaining portion 52 thereof made of a copper-chromium alloy. That is, both of the angles of the copper-tungsten alloy 51 and the copper-chromium alloy 52 having a smaller rigidity than that of the copper-tungsten alloy 51 to the free edges of the respective alloys at the end portion of the joined surface were set to be smaller than 90 degrees, or when the angle of one of the alloys was 90 degrees ($\theta_1$), the angle of the remaining alloy to the free edge at the end portion of the joined surface was set to be smaller than 90 degrees ($\theta_5$).

Thus, it was possible to increase the tensile strength and impact strength of the joined structure to improve reliability, and it was possible to decrease the arcing contact in size.

EXAMPLE 7

As an example of joining of dissimilar metallic materials having different characteristics using the friction welding, the joining of a copper material and an aluminum material will be described.

Figures 16A, 16B, 16C:
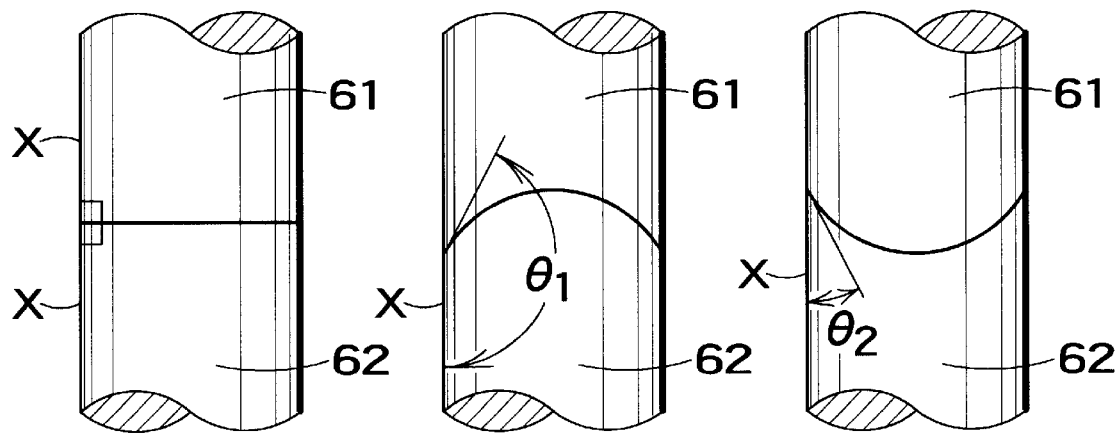
FIGS. 16A through 16E are views, each showing a preferred embodiment of a joined structure of a joint of rod-like dissimilar metallic materials according to the present invention.
Figures 16D, 16E:
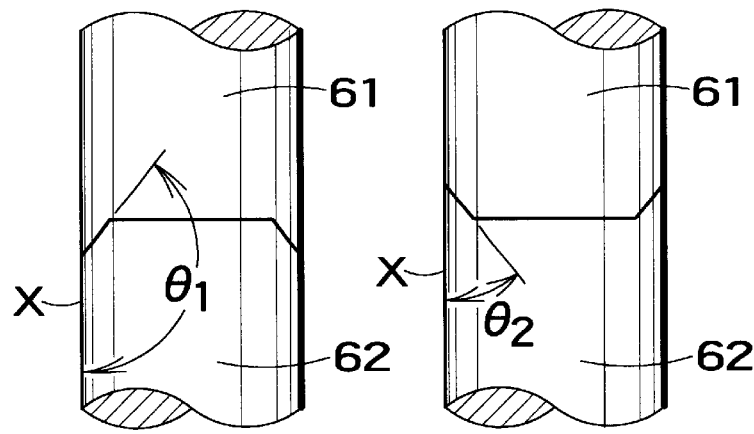
Figure 17A:
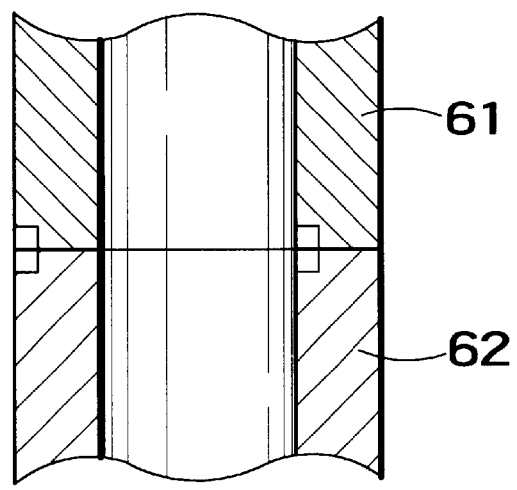
FIGS. 17A through 17C are views, each showing a preferred embodiment of a joined structure of a joint of pipe-like dissimilar metallic materials according to the present invention.
Figures 17B, 17C:
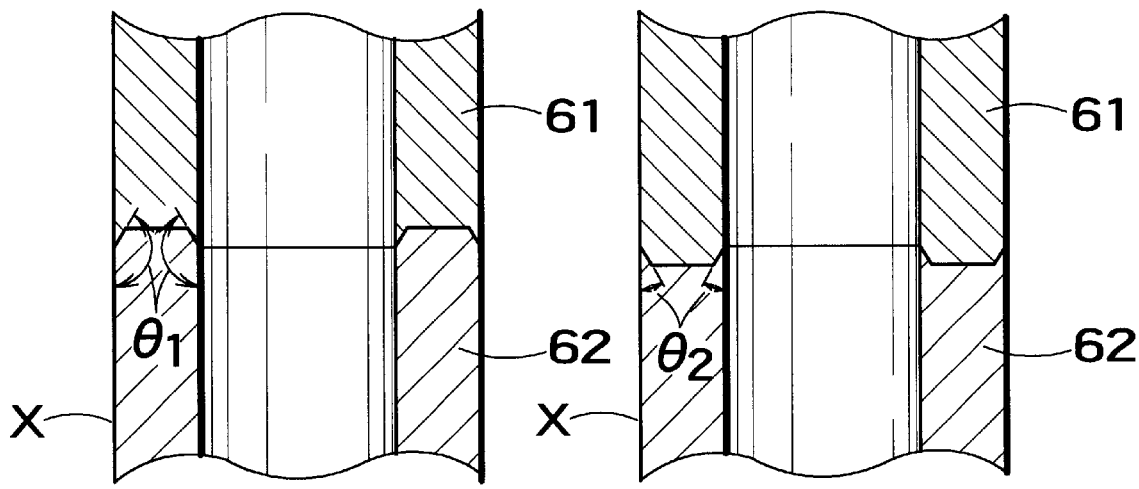

Each of FIGS. 16A through 16E shows a joined structure of a joint of rod-like dissimilar metallic materials, and each of FIGS. 17A through 17C shows a joined structure of a joint of pipe-like dissimilar metallic materials. FIG. 16A and FIG. 17A show conventional rod-like and pipe-like joined structures, respectively.

As shown in FIGS. 16A through 16E and 17A through 17C, various joined members having different angles of an aluminum material 61 and a copper material 62 to the free edges thereof at the end portion of the joined surface were prepared, and the joined members of the aluminum material 61 and the copper material 62 were joined to each other using the friction welding to prepare joined structures. That is, as shown in FIGS. 16B, 16D and 17B, the angle $\theta_1$ of the copper material 62 to the free edge X at the end portion of the joined surface between the aluminum material 61 and the copper material 62 was set to be greater than or equal to 120 degrees. In addition, as shown in FIGS. 16C, 16E and 17C, the angle $\theta_2$ of the copper material 62 to the free edge X at the end portion of the joined surface between the aluminum material 61 and the copper material 62 was set to be in the range of from 55 degrees to 85 degrees.

Figure 18:
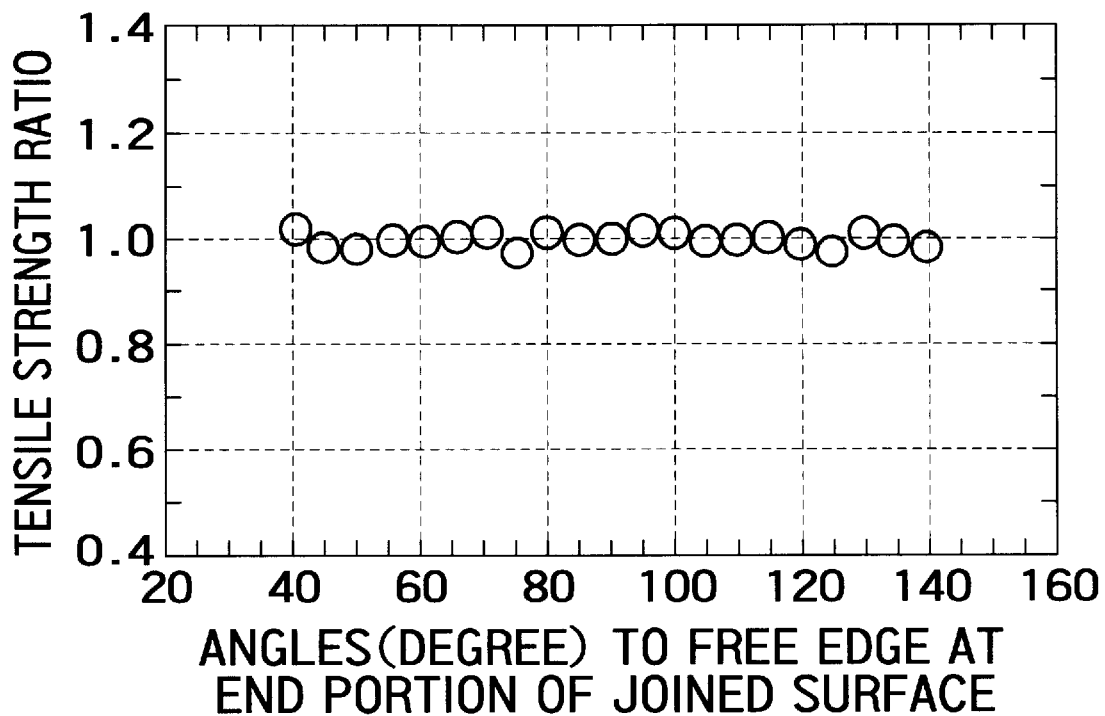
FIG. 18 is a graph showing the relationship between the angle of dissimilar metallic materials to the free edge at the edge portion of the joined surface in a joined structure of the metallic materials, and the tensile strength.
Figure 19:
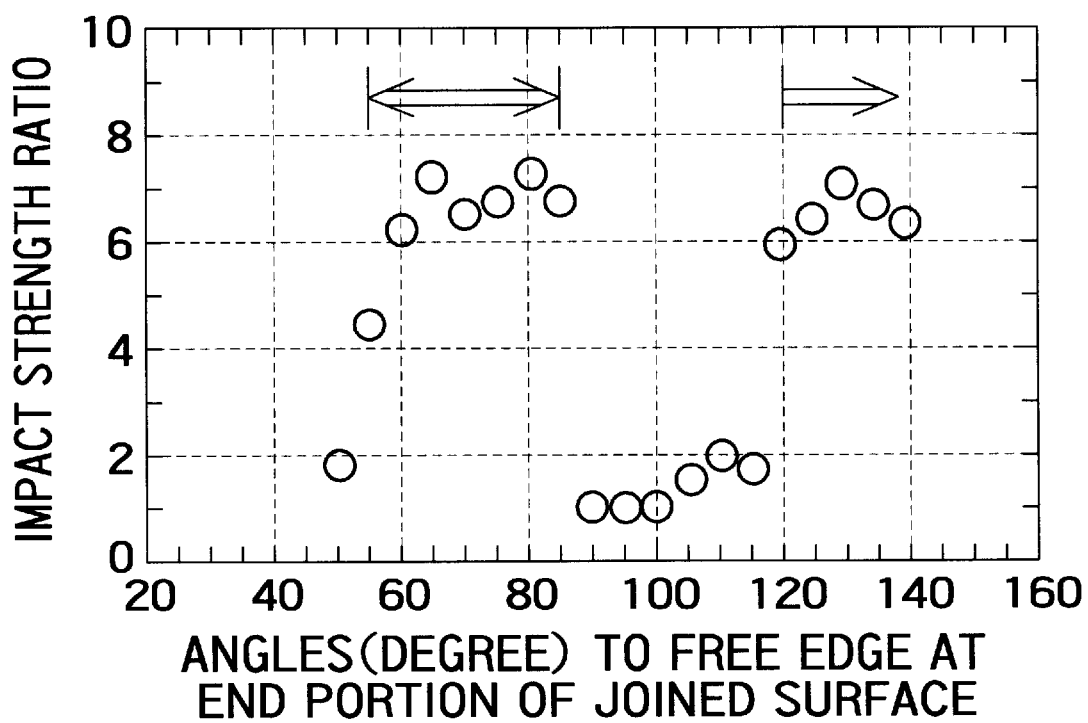
FIG. 19 is a graph showing the relationship between the angle of dissimilar metallic materials to the free edge at the edge portion of the joined surface in a joined structure of the metallic materials, and the impact strength.

In addition, various joined members having different angles of from 40 degrees to 140 degrees to the free edge at the end portion of the joined surface between a copper material and an aluminum material were prepared, and the tensile and impact tests thereof were carried out. The tensile test results are shown in FIG. 18, and the impact test results are shown in FIG. 19. Furthermore, the tensile strength ratio and the impact strength ratio are obtained assuming that the strength is 1 at 90 degrees.

As can be seen from FIG. 18, the tensile strength was constant regardless of the angle to the free edge at the end portion of the joined surface. However, as can be seen from FIG. 19, when the angle of the copper material to the free edge at the end portion of the joined surface of the copper material was in the range of from 50 degrees to 85 degrees or greater than or equal to 120 degrees, the impact strength was higher than that at a conventional angle of 90 degrees.

EXAMPLE 8

When an aluminum material (aluminum or an aluminum alloy) is joined to a copper material (copper or a copper alloy) by the friction welding, both elements are heated by frictional heat to be diffused to form a reaction layer of an intermetallic compound, such as $Al_2Cu$, $AlCu$ or $AlCu_2$. With respect to the joined structures of dissimilar metallic materials having such s reaction layer, the tensile and impact tests were carried out to examine the relationship between the thickness of the reaction layer and the tensile or impact strength.

Figure 20:
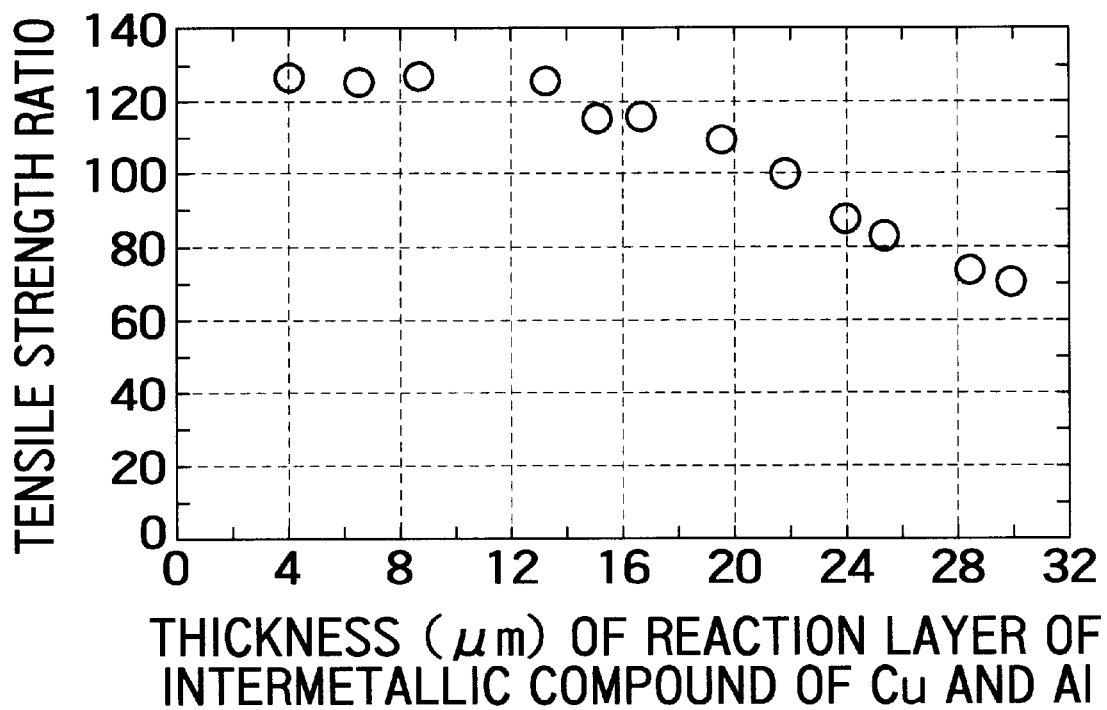
FIG. 20 is a graph showing the relationship between the thickness of a reaction layer of an intermetallic compound on the joined surface of dissimilar metallic materials, and the tensile strength.

The tensile test results are shown in FIG. 20. The tensile strength ratio is expressed with respect to the tensile strength of the aluminum alloy assuming that the tensile strength of the aluminum alloy is 100.

Figure 21:
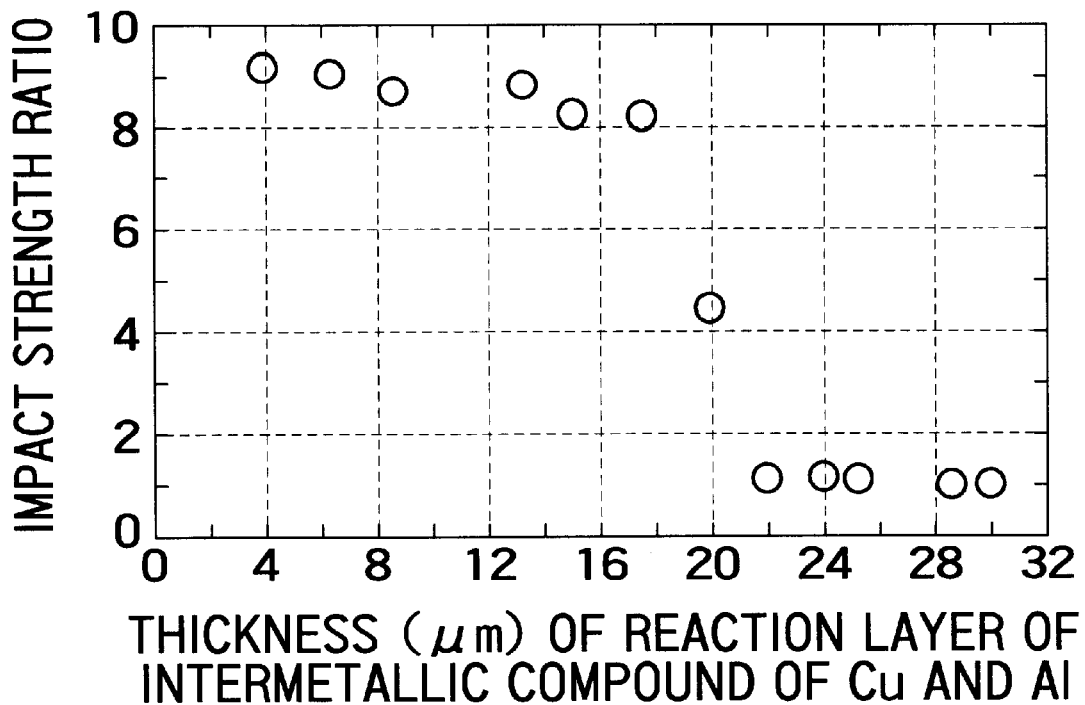
FIG. 21 is a graph showing the relationship between the thickness of a reaction layer of an intermetallic compound on the joined surface of dissimilar metallic materials, and the impact strength.

The impact test results are shown in FIG. 21. The impact strength ratio is expressed assuming that the impact strength is 1 when the thickness of the reaction layer is 15 $\mu$m.

As can be seen from FIGS. 20 and 21, when the thickness of the reaction layer is smaller than or equal to 20 $\mu$m, the tensile and impact strengths are high. However, when the thickness of the reaction layer exceeds 20 $\mu$m, the impact strength is showing a tendency to decrease although the tensile strength is not changed.

EXAMPLE 9

Figure 22A:
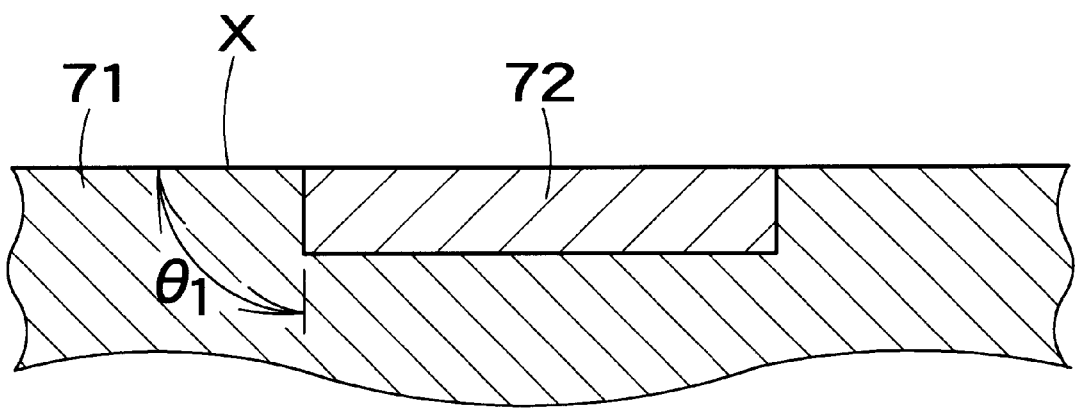
FIGS. 22A through 22C are views, each showing the coating end structure of a coating member comprising a copper base and silver serving as a coating material coated on the copper base.

FIG. 22 shows a preferred embodiment of a coating end structure of a coating member, which comprises a metal base and a coating material having a different material characteristic from that of the metal base.

Figure 22B:
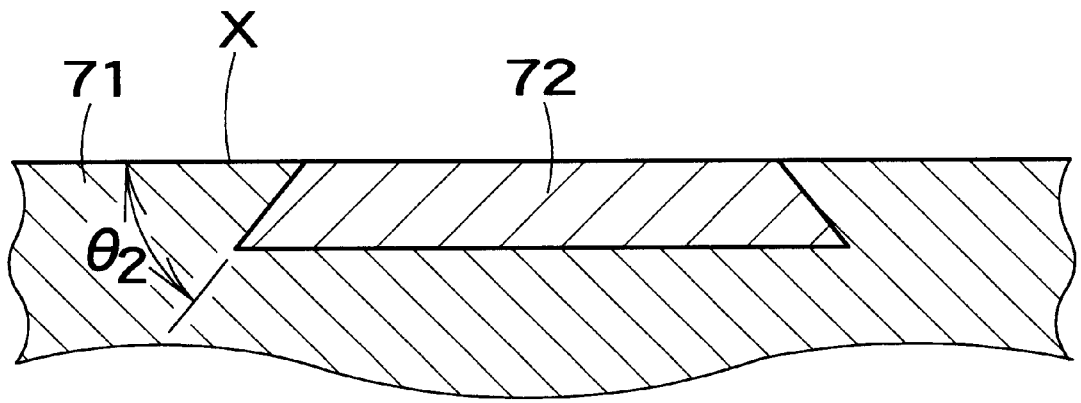
Figure 22C:
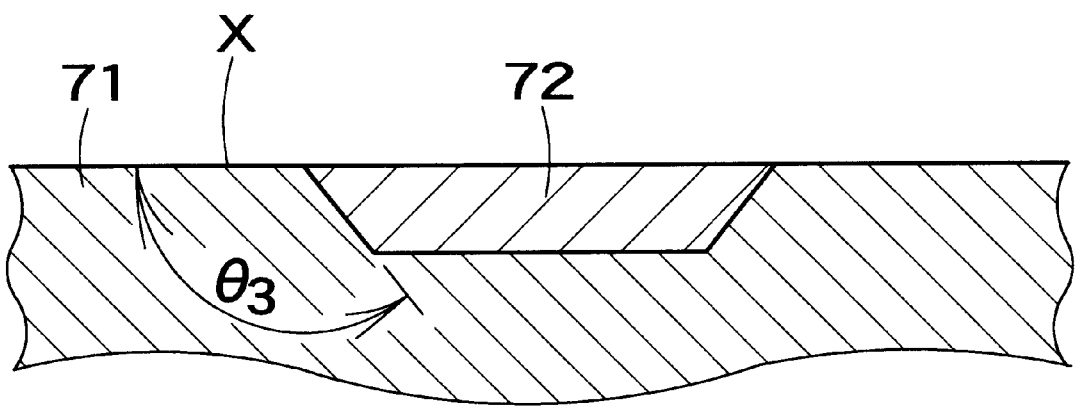

A copper base 71 has a greater rigidity than that of silver serving as a coating material 72. Therefore, after recessing was carried out so that the angle of the copper base 71 to the free edge X was greater than or equal to 120 degrees ($\theta_3$) as shown in FIG. 22C or in the range of from 55 degrees to 85 degrees ($\theta_2$) as shown in FIG. 22B, silver coating was carried out.

Figure 23:
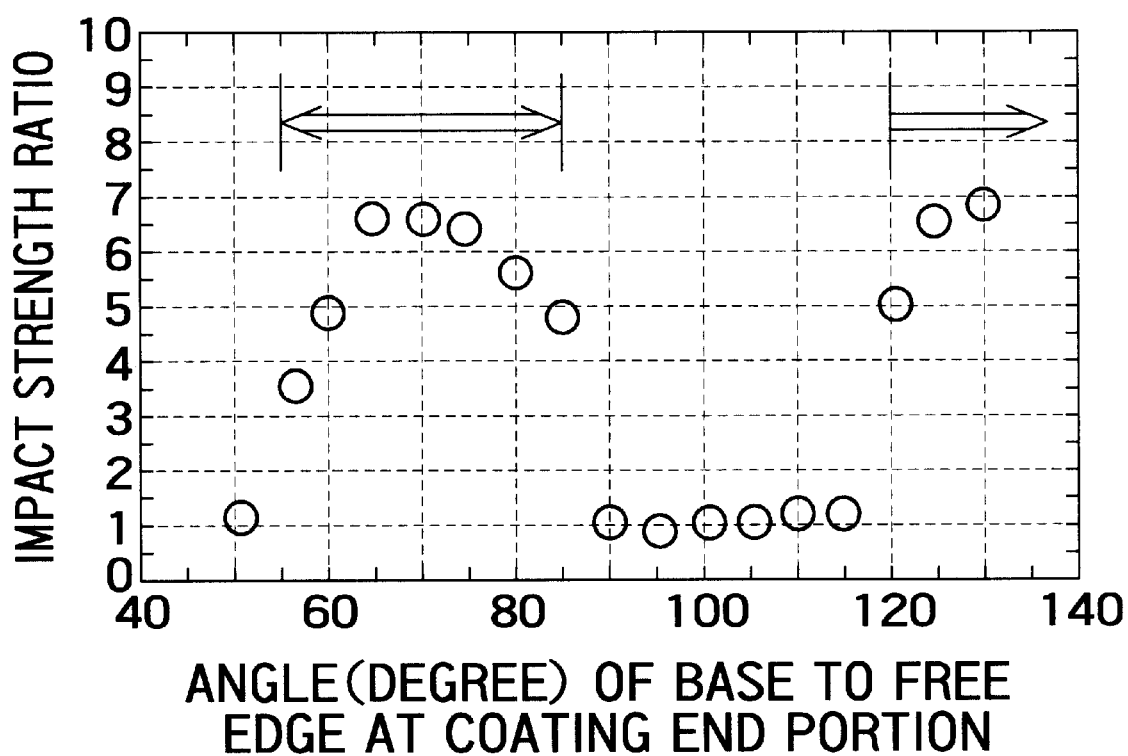
FIG. 23 is a graph showing the relationship between the angle of a metal base to the free edge in the coating end structure shown in FIG. 22, and the impact strength.

With respect to the coating member comprising the copper base and silver coated thereon, the impact test was earned out to examine the angle of the metal base to the free edge X at the coating end portion and the impact strength ratio. The results thereof are shown in FIG. 23. Furthermore, the impact strength ratio is a strength distribution at respective set angles assuming that the impact strength is 1 at an angle of 90 degrees.

As shown in FIG. 23, the impact strength at the above described set angle for the copper base was higher that that at a conventional angle of 90 degrees ($\theta_1$ in FIG. 22A), and the reliability of the member comprising the copper base and silver coated thereon was greatly improved.

EXAMPLE 10

Figure 24A:
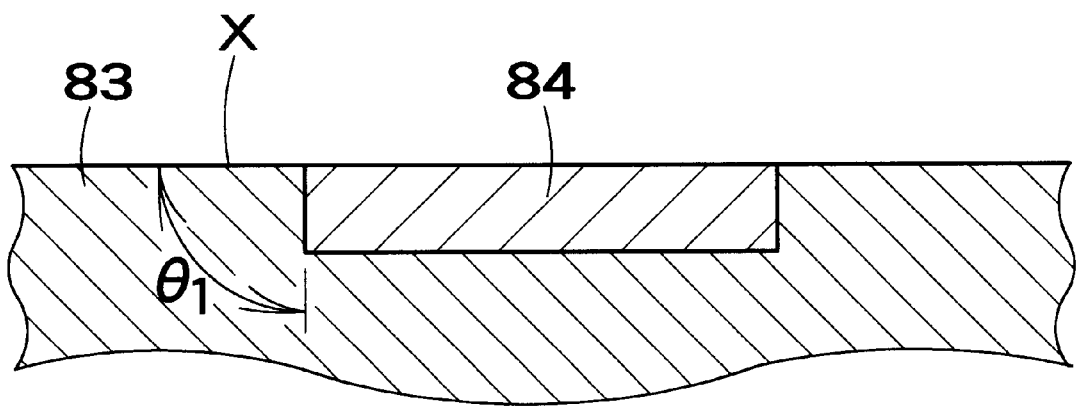
FIGS. 24A through 24C are views, each showing the coating end structure of a coating member comprising an aluminum base and silver serving as a coating material coated on the aluminum base.

FIG. 24 shows a preferred embodiment of a coating end structure of a coating member, which comprises an aluminum base and silver coated thereon.

Figure 24B:
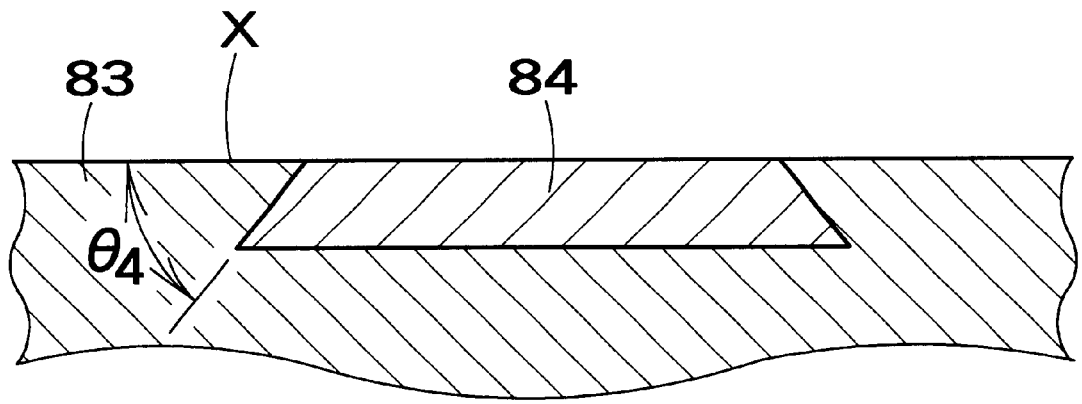
Figure 24C:
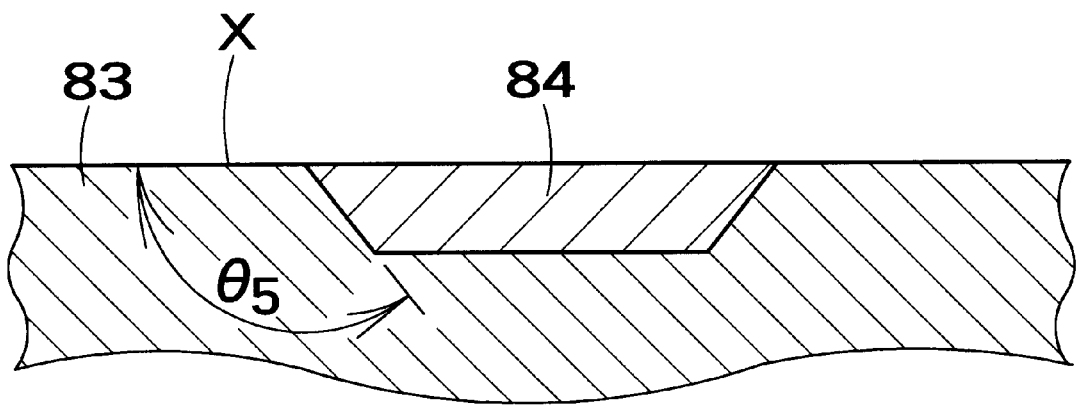

An aluminum base 83 has a greater rigidity than that of silver serving as a coating material 84. Therefore, after recessing was carried out so that the angle of the aluminum base 83 to the free edge X was less than or equal to 60 degrees ($\theta_4$) as shown in FIG. 24B or in the range of from 95 degrees to 125 degrees ($\theta_5$) as shown in FIG. 24C, silver coating was carried out.

Figure 25:
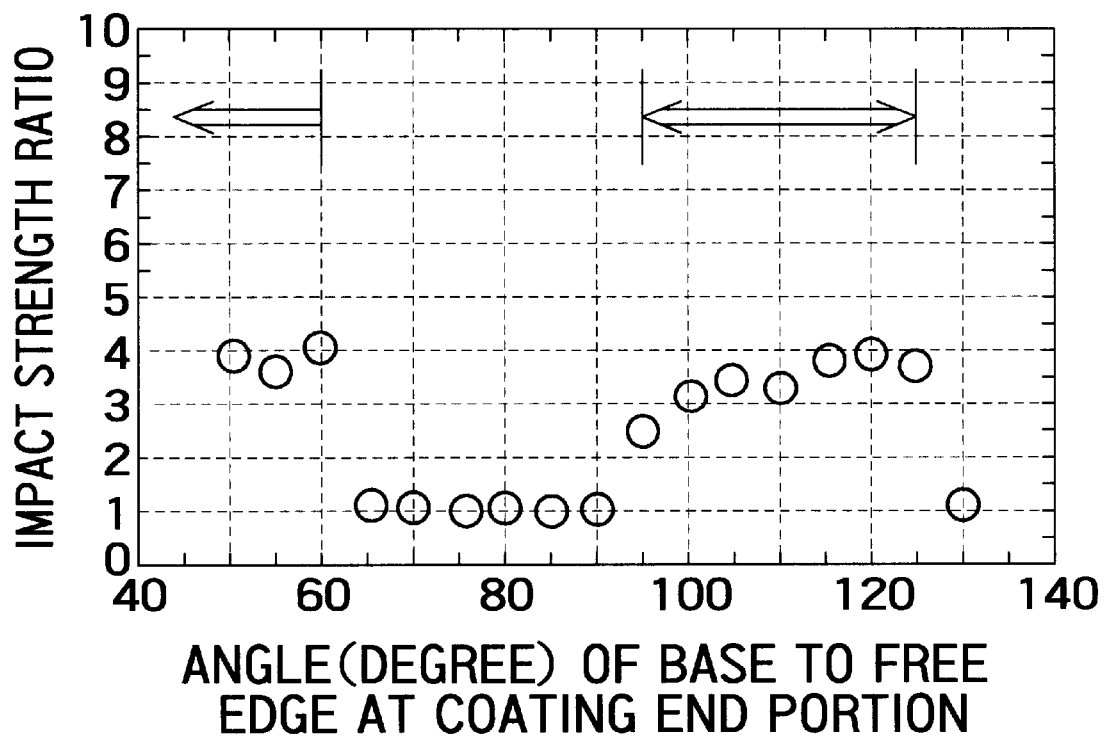
FIG. 25 is a graph showing the relationship between the angle of a metal base to the free edge in the coating end structure shown in FIG. 24, and the impact strength.

With respect to the coating member comprising the aluminum base and silver coated thereon, the impact test was carried out to examine the angle of the base to the free edge X at the coating end portion and the impact strength ratio. The results thereof are shown in FIG. 25. Furthermore, the impact strength ratio is a strength distribution at respective set angles assuming that the impact strength is 1 at an angle of 90 degrees.

As shown in FIG. 25, the impact strength at the above described set angle for the aluminum base was higher than that at a conventional angle of 90 degrees ($\theta_1$ in FIG. 24A), and the reliability of the silver coating member to the aluminum base was greatly improved.

EXAMPLE 11

Figure 26:
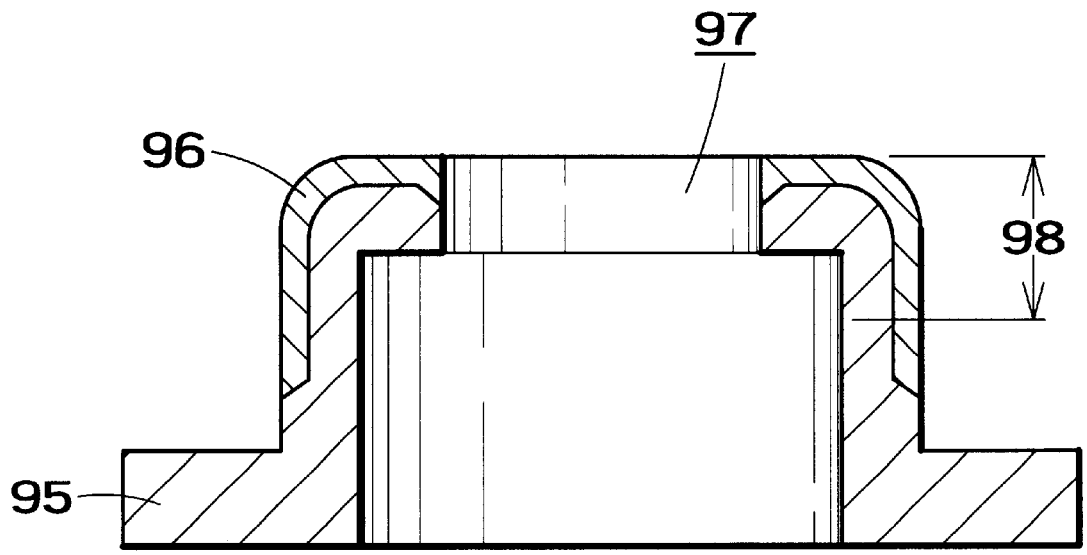
FIG. 26 is a view showing a preferred embodiment of a coating end structure applied to a current-carrying contact according to the present invention.

FIG. 26 shows a preferred embodiment of a coating structure according to the present invention, which is applied to a current-carrying contact for use in a power breaker.

An aluminum base 95 adopts a coating structure wherein at least a contact portion of a contact is made of copper, a copper alloy, silver or a silver alloy. That is, in a coating member 97 comprising a recessed aluminum base 95 and a coating material 96 of copper, a copper alloy, silver or a silver alloy, which have a greater rigidity than that of the aluminum base formed in the groove, there was provided a coating end structure wherein the angle of the aluminum base 95 to the free edge X at the end portion was set to be smaller than or equal to 60 degrees or in the range of from 95 degrees to 125 degrees. Furthermore, reference number 98 denotes a contact region of a contact.

Thus, it was possible to carry out a coating of a high reliability and a high conductivity at the contact portion of the contact.

If the coating end portion exists in the contact portion in the joining wherein the coating structure is used as a current-carrying part, the coating end portion is easily damaged by the opening and closing operations of the contact. Therefore, in the coating structure, the coating end portion is preferably apart from the contact portion.

In addition, if the electrical resistance on the coating interface is high in the coating structure, this portion generates heat to deteriorate the reliability of the coating member. Therefore, the coating structure preferably has the same electrical resistance as that of the base metal, and the electrical resistance on the coating interface is preferably small.

EXAMPLE 12

Figure 27:
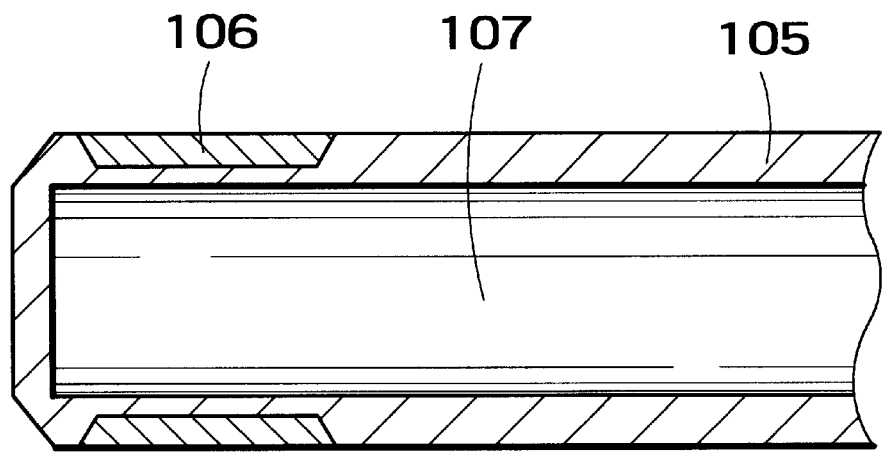
FIG. 27 is a view showing a preferred embodiment of a coating end structure applied to a conductor of a power breaker or switch according to the present invention.

FIG. 27 shows a preferred embodiment of a coating structure according to the present invention, which is applied to a conductor for use in a power breaker or switch.

An aluminum base 105 adopts a coating structure wherein a contact portion of a conductor is made of copper, a copper alloy, silver or a silver alloy. That is, in a coating member 107 comprising a recessed aluminum base 10 and a coating material 10 of copper, a copper alloy, silver or a silver alloy, which have a greater rigidity than that of the aluminum base formed in the groove, there was provided a coating end structure wherein the angle of the aluminum base 105 to the free edge X at the coating end portion was set to be smaller than or equal to 60 degrees or in the range of from 95 degrees to 125 degrees.

Thus, it was possible to carry out a coating of a high reliability and a high conductivity at the contact portion of the conductor for use in the power breaker or switch.

EXAMPLE 13

Figure 28:
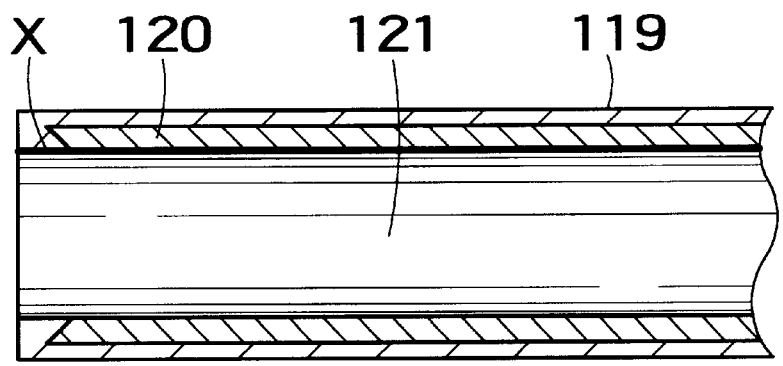
FIG. 28 is a view showing a preferred embodiment of a coating end structure applied to a moving blade of a gas turbine or a breaking portion of combustor according to the present invention.

FIG. 28 shows a preferred embodiment of a coating structure comprising a recessed Ni or Co group heat resisting alloy base and an MCrAlY corrosion resisting alloy (M is Ni and/or Co) coated on the heat resisting alloy base as a coating material.

Since the Ni or Co group heat resisting alloy serving as a metal base 119 had a greater rigidity than that of the MCrAlY corrosion resisting alloy 120, the coating end structure was set so that the angle of the metal base 119 to the free edges X at the coating end portion of the coating member was greater than or equal to 120 degrees or in the range of from 55 degrees to 85 degrees. Furthermore, in FIG. 28, reference number 121 denotes a combustor.

Thus, it was possible to greatly improve the reliability of the coating member wherein the MCrAlY corrosion resisting alloy (M is Ni and/or Co) 120 is coated on the Ni or Co heat resisting alloy base 119. Thus, it was possible to apply a coating structure comprising an MCrAlY corrosion resisting alloy to a corrosion resisting portion of an Ni or Co group heat resisting alloy in a moving blade or combustor for use in a gas turbine.

EXAMPLE 14

Figure 29A:
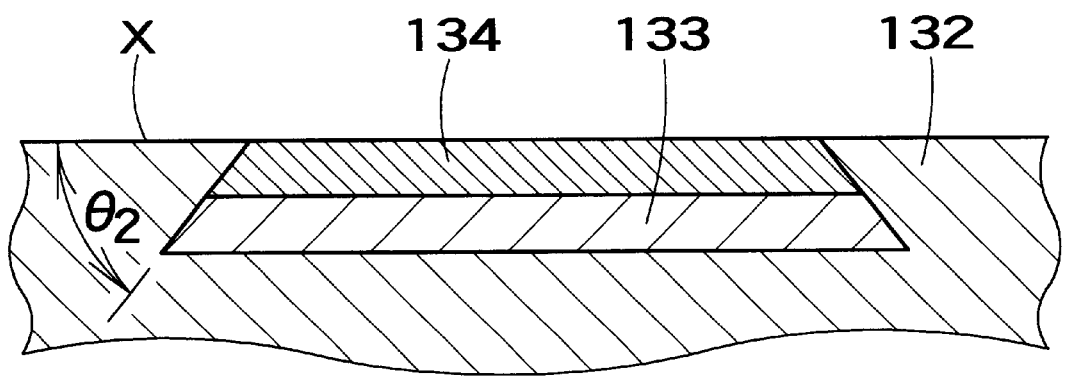
FIGS. 29A and 29B are views, each showing a coating end portion according to the present invention, wherein an MCrAlY corrosion resisting alloy and zirconia ceramic serving as coating materials are coated on a base of an Ni or Co group heat resisting alloy.
Figure 29B:
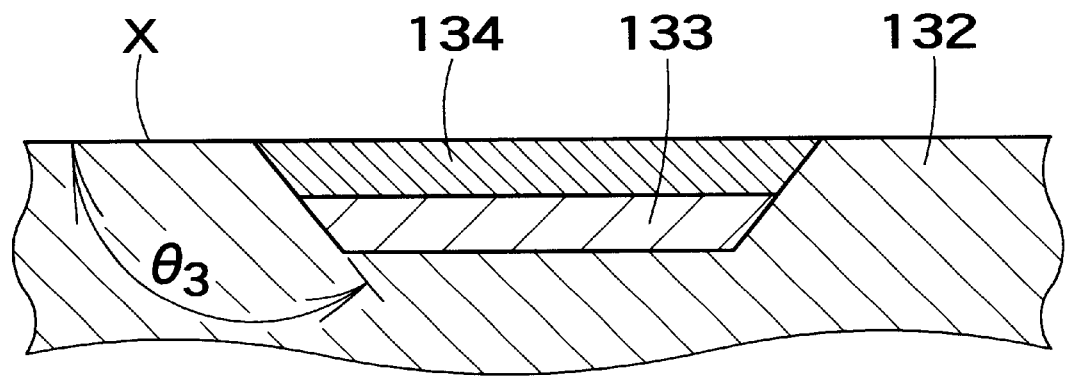

FIG. 29 shows a preferred embodiment of a coating structure wherein an MCrAlY corrosion resisting alloy (M is Ni and/or Co) is bond coated on a recessed Ni or Co group heat resisting alloy and a zirconia ceramics topcoat is coated thereon.

An Ni or Co group heat resisting alloy 132 has a greater rigidity than that of an MCrAlY corrosion resisting alloy (M is Ni and/or Co) bond coat 133 or a zirconia ceramics topcoat 134. Therefore, in the coating member, the coating end structure was set so that the angle of the base to the free edges X at the coating end portion was in the range of from 55 degrees to 85 degrees ($\theta_2$) or greater than or equal to 120 degrees ($\theta_3$).

Thus, it was possible to greatly improve the reliability of the coating member wherein the MCrAlY corrosion resisting alloy (M is Ni and/or Co) 133 is bond coated on the Ni or Co group heat resisting alloy base 132 and a zirconia ceramics topcoat 134 is coated thereon.

Therefore, it was possible to apply a coating structure, which comprises an MCrAlY corrosion resisting alloy (M is Ni and/or Co) bond coat and a zirconia ceramics topcoat, to a thermal insulating portion of an Ni or Co group heat resisting alloy in a moving blade or combustor for use in a gas turbine.

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

What is claimed is:

1. A friction welded joint structure of dissimilar metallic materials, comprising first and second metallic materials which are friction welded together, wherein the second metallic material has a smaller rigidity than the first metallic material, and wherein an angle of the first metallic material to a free edge of the first metallic material, at an end portion of a joined surface between the first and second metallic materials, is greater than or equal to 120 degrees or in the range of from 55 degrees to 85 degrees, and wherein a reaction layer between the first and second metallic materials is more than zero and less than or equal to 20 $\mu$m, and wherein one of the first and second metallic materials is copper, and wherein the other of the first and second metallic materials having the smaller rigidity is aluminum.

2. A friction welded joint structure as set forth in claim 1, wherein the friction welded joint structure has a high impact strength characteristics.

3. A friction welded joint structure of dissimilar metallic materials, which comprises:

a contact portion of a current-carrying contact for use in a power breaker, said contact portion being made of copper or a copper alloy, and friction welded to a remaining portion of the current-carrying contact other than said contact portion, said remaining portion being made of aluminum or an aluminum alloy, and wherein an angle of said contact portion to a free edge of said contact portion, at an end portion of a joined surface between said contact portion and said remaining portion, is greater than or equal to 120 degrees or in the range of from 55 degrees to 85 degrees; and a friction weld reaction layer formed at the friction welded contact portion which has a thickness of more than zero and less than or equal to 20 $\mu$m.

4. A friction welded joint structure as set forth in claim 2, wherein the friction welded joint structure has a high impact strength characteristic.

5. A joined structure of dissimilar metallic materials, which comprises a contact portion of an arcing contact for use in a power breaker, said contact portion being made of a copper-tungsten alloy, and a remaining portion of the arcing contact other than said contact portion, said remaining portion being made of a material selected from the group consisting of iron, an iron alloy and a copper alloy, and wherein an angle of said contact portion of copper-tungsten alloy to a free edge of said contact portion, at an end portion of a joined surface between said contact portion and said remaining portion, is greater than or equal to 120 degrees or in the range of from 55 degrees to 85 degrees.

6. A joined structure of dissimilar metallic materials as set forth in claim 5, wherein said joined surface between said dissimilar metallic materials is spaced from a contact end of said contact portion.

7. A joined structure of dissimilar metallic materials as set forth in claim 5, wherein a joined portion has the same electrical resistance as that of a base metal.

8. A friction welded joint structure of dissimilar metallic materials, comprising first and second metallic materials which are friction welded together, wherein the second metallic material has a smaller rigidity than that of the first metallic material, wherein both angles of the first and second metallic materials to free edges of the respective metallic materials, at an end portion of a joined surface between said metallic materials, are smaller than 90 degrees, and wherein a friction welding reaction layer produced between the first and second metallic materials is more than zero and less than or equal to 20 μm, and wherein one of the first and second metallic materials is copper, and wherein the other of the first and second metallic materials having a small rigidity is aluminum.

9. The friction welded structure as set forth in claim 8, wherein one of the first and second metallic materials is a contact portion of a current-carrying contact for use in a power breaker which is made of copper, and the other of the first and second metallic materials is a remaining portion of the current-carrying contact which is made of aluminum.

10. The friction welded structure as set forth in claim 9, wherein joined surface between said dissimilar metallic materials is spaced from a contact end of said contact portion.

11. The friction welded structure as set forth in claim 9, wherein a joined portion has the same electrical resistance as that of a base metal.

12. A friction welded joint structure as set forth in claim 8, wherein the friction welded joint structure has a high impact strength characteristic.

13. A friction welded structure of dissimilar metallic materials, comprising a first metallic material which is friction welded to a second metallic material having a smaller rigidity than that of the first metallic material, wherein one of first and second angles one between the first and second metallic materials and free edges of the respective first and second metallic materials, at an end portion of a joined surface between the first and second metallic materials, is 90 degrees, wherein the other of the first and second angles at the end portion of the joined surface, is smaller than 90 degrees, and wherein a friction welding reaction layer between the first and second metallic materials has a thickness of more than zero and less than or equal to 20 μm, and wherein one of the first and second metallic materials is copper, and wherein the other of the first and second metallic materials having a smaller rigidity is aluminum.

14. A friction welded joint structure as set forth in claim 13, wherein the friction welded joint structure has a high impact strength characteristic.

15. A joined structure of dissimilar metallic materials, comprising a first metallic material, wherein the first metallic material is joined to a second metallic material having a smaller rigidity than that of the first metallic material, wherein both angles of the first metallic material and the second metallic material to free edges of the respective first and second metallic materials, at an end portion of a joined surface between said metallic materials, are smaller than 90 degrees, and wherein the first and second metallic materials are joined with each other by friction welding; and wherein the first metallic material is steel, and the second metallic material is copper or a copper alloy.

16. A joined structure of dissimilar metallic materials, comprising a first metallic material which is joined to a second metallic material having a smaller rigidity than that of the first metallic material, wherein both angles of the first metallic material and the second metallic material to free edges of the respective first and second metallic materials, at an end portion of a joined surface between said metallic materials, are smaller than 90 degrees, wherein said metallic materials are joined with each other by friction welding, and wherein the first metallic material is a contact portion of an arcing contact for use in a power breaker which is made of a copper-tungsten alloy, and the second metallic material is a remaining portion of the arcing contact, other than said contact portion, which is made of a material selected from the group consisting of iron, an iron alloy and a copper alloy.

17. A friction welded joint structure of dissimilar metallic materials comprising:

first and second metallic materials which are friction welded together, wherein the second metallic material is made of aluminum and the first metallic material is made of copper, wherein an angle of the second metallic material to a free edge of the second metallic material, at an end portion of a joined surface, is set to be in the range of from 50 degrees to 85 degrees, and wherein a friction welding reaction layer produced the first and second metallic materials is more than zero and less than or equal to 20 μm.

18. The friction welded structure as set forth in claim 17, which is used for a power breaker, and wherein at least a contact portion of a contact is said other metallic material which is made of copper, and the remaining portion of the contact is said one of metallic materials which is made of aluminum.

19. The friction welded structure as set forth in claim 17, which is used as a current-carrying part having a contact, and wherein said joined surface is apart from a contact portion of said contact.

20. A friction welded joint structure as set forth in claim 17, wherein the friction welded joint structure has a high impact strength characteristic.

21. A friction welded joint structure of dissimilar metallic materials comprising first and second metallic materials which are friction welded together, wherein one of the first and second metallic materials is made of aluminum and the other of the first and second metallic materials is made of copper, the first and second metallic materials being joined by friction welding so that an angle of the second metallic material to a free edge of the second metallic material, at an end portion of a joined surface, is set to be greater than or equal to 120 degrees and so that a friction welding reaction layer produced between the first and second metallic materials is more than zero and less than or equal to 20 μm.

22. A friction welded joint structure as set forth in claim 21, wherein the friction welded joint structure has a high impact strength characteristic.

23. A friction welded joint structure of dissimilar metallic materials, comprising first and second metallic materials which are friction welded together, wherein one of the first and second metallic materials is made of aluminum and the other of the first and second metallic materials is made of copper, the first and second metallic materials being joined by friction welding to form a friction welding reaction layer between the first and second metallic materials which is more than zero and less than or equal to 20 μm, and so that both angles of the first and second metallic materials to free edges of the respective first and second metallic materials, at an end portion of a joined surface between the first and second metallic materials, are set to be smaller than 90 degrees.

24. A friction welded joint structure as set forth in claim 23, wherein the friction welded joint structure has a high impact strength characteristic.

25. A friction welded joint structure of dissimilar metallic materials, comprising first and second metallic materials which are friction welded together, one of the first and second metallic materials being made of aluminum and the other of the first and second metallic materials is made of copper, the first and second metallic materials being joined by friction welding to form a friction welding reaction layer between the first and second metallic materials which is more than zero and less than or equal to 20 μm, so that first and second angles of the first and second metallic materials to free edges of the respective first and second metallic materials, at an end portion of a joined surface, are 90 degrees, and less than 90 degrees, respectively.

26. A friction welded joint structure as set forth in claim 25, wherein the friction welded joint structure has a high impact strength characteristic.

* * * * *